United States Patent
Byrnes et al.

(10) Patent No.: US 9,845,123 B2
(45) Date of Patent: Dec. 19, 2017

(54) MODULAR ELECTRIC VEHICLE SYSTEM

(71) Applicant: Saskatchewan Ltd., Saskatoon, Saskatchewan (CA)

(72) Inventors: Patric Byrnes, Saskatoon (CA); Michael Lockerbie, Saskatoon (CA); David Cote, Saskatoon (CA)

(73) Assignee: Saskatchewan Ltd., Saskatoon, Saskatchewan (CA)

( * ) Notice: Subject to any disclaimer, the term of this patent is extended or adjusted under 35 U.S.C. 154(b) by 28 days.

(21) Appl. No.: 14/896,636

(22) PCT Filed: Jun. 9, 2014

(86) PCT No.: PCT/CA2014/000488
§ 371 (c)(1),
(2) Date: Dec. 7, 2015

(87) PCT Pub. No.: WO2014/194409
PCT Pub. Date: Dec. 11, 2014

(65) Prior Publication Data
US 2016/0129958 A1     May 12, 2016

Related U.S. Application Data

(60) Provisional application No. 61/834,697, filed on Jun. 13, 2013.

(30) Foreign Application Priority Data

Jun. 7, 2013   (CA) ..................................... 2818409

(51) Int. Cl.
*G06F 19/00*     (2011.01)
*B62D 63/02*     (2006.01)
(Continued)

(52) U.S. Cl.
CPC ............ *B62D 63/025* (2013.01); *B60L 11/18* (2013.01); *B60L 15/20* (2013.01); *B60L 15/32* (2013.01);
(Continued)

(58) Field of Classification Search
CPC .. B60L 15/32; B60L 2200/36; B60L 2200/40; B60P 3/42
(Continued)

(56) References Cited

U.S. PATENT DOCUMENTS 7,715,962 B2   5/2010   Rowe et al.
8,171,858 B2   5/2012   Wamble, III et al.
(Continued)

FOREIGN PATENT DOCUMENTS

WO     WO 93/22151 A1     11/1993

OTHER PUBLICATIONS

International Search Report and Written Opinion of corresponding International Application No. PCT/CA2014/000488; 8 pages; date of completion Sep. 19, 2014.

*Primary Examiner* — Ronnie Mancho
(74) *Attorney, Agent, or Firm* — Shumaker, Loop & Kendrick, LLP

(57) ABSTRACT

A modular electric vehicle system, allowing for the assembly of many different vehicle configurations using a plurality of interchangeable vehicle assembly modules, including at least two powered vehicle assembly modules in an assembled vehicle each of which has self-contained drive and power systems and controls which can be connected together by a central network bus on the vehicle. At least one of the powered vehicle assembly modules will be a steering module, with the necessary additional controls and components to steer the axle thereon and in turn steer the assembled vehicle. The connection of the network bus and the modules
(Continued)

would be done in an interchangeable way so that different modules could be interchangeably placed in the assembled vehicle. Various steering systems, control methodologies and vehicle attachments are also disclosed.

44 Claims, 17 Drawing Sheets

(51) Int. Cl.
 *B60L 11/18* (2006.01)
 *B60L 15/32* (2006.01)
 *B60L 15/20* (2006.01)
 *B60P 3/42* (2006.01)

(52) U.S. Cl.
 CPC ............. *B60P 3/42* (2013.01); *B60L 2200/36* (2013.01); *B60L 2200/40* (2013.01); *B60L 2200/44* (2013.01); *B60L 2220/42* (2013.01); *B60L 2270/40* (2013.01); *Y02P 90/60* (2015.11); *Y02T 10/648* (2013.01); *Y02T 10/7005* (2013.01); *Y02T 10/7258* (2013.01); *Y02T 90/16* (2013.01)

(58) Field of Classification Search
 USPC ............................................................ 180/12
 See application file for complete search history.

(56) References Cited

U.S. PATENT DOCUMENTS

| | | | |
|---|---|---|---|
| 2003/0046802 A1* | 3/2003 | Chernoff | B60G 7/003 29/428 |
| 2010/0263948 A1* | 10/2010 | Couture | B25J 5/005 180/8.2 |
| 2012/0215348 A1* | 8/2012 | Skrinde | B08B 9/049 700/245 |
| 2014/0306814 A1* | 10/2014 | Ricci | H04W 48/04 340/425.5 |
| 2014/0309863 A1* | 10/2014 | Ricci | G01C 21/3484 701/36 |
| 2014/0309868 A1* | 10/2014 | Ricci | B60Q 1/00 701/36 |
| 2015/0189830 A1* | 7/2015 | Jagenstedt | G05D 1/0265 701/26 |
| 2016/0207418 A1* | 7/2016 | Bergstrom | B60L 11/1879 |
| 2016/0318468 A1* | 11/2016 | Ricci | B60R 16/037 |

* cited by examiner

MODULAR ELECTRIC VEHICLE SYSTEM

This invention is in the field of electric utility and service vehicles, and more specifically relates to a system of modular vehicle assembly components and modules which allows for the flexible assembly and maintenance of electric vehicles of different configurations using various modules with a standardized attachment method and central network bus.

BACKGROUND

Electric vehicles have many different consumer and commercial applications. These vehicles typically consist of an electric motor drive as well as a rechargeable battery system—the vehicle is operated using power stored within the batteries, and when the batteries require it they can be recharged. At a consumer level, society is seeing a proliferation of electric cars and other similar vehicles—many consumers are motivated to purchase or drive an electric vehicle as an environmental choice, to minimize vehicle emissions.

In commercial applications, there are environmental as well as other factors which in certain cases favor the use of electric vehicles over those using internal combustion engines and the like. For example in a closed working environment it is often desired to use electric vehicles to minimize pollution of the working environment with internal combustion emissions—ventilation problems and costs are minimized. It is often desired to minimize the safety risk factors within the working environment by, for example, minimizing the presence of combustible fuel and similar materials within the environment. One of the additional issues with the use of electric vehicles in industrial environments is the simplicity of repair. Making electric vehicles available which were modular in nature to optimize the on-site repair aspects of their deployment would enhance the attractiveness of this type of a platform for industrial users.

One of the other limitations to date in the adoption of electric vehicles in mining and other industrial applications is that each time a vehicle was required with custom configuration or options it often required significant actual custom manufacture. The variety of electric vehicles which were available for use in these types of applications was limited—a limited number of predetermined payloads or configurations would potentially be manufactured. Purchasers desiring equipment of customized size or functionality were often left with either significant costs to manufacture on a custom basis or without the ability to procure a more fulsome menu of vehicle configurations. A method of manufacture or vehicle configuration which would allow for the economical customization of electric vehicles for various users would it is believed to be desirable in the marketplace.

Another limitation in terms of the size and flexibility of available configurations of electric vehicles which has potentially limited their commercial attraction to date, again particularly in industrial applications, is the size limitation. There have been a number of reasons for this. Firstly, and particularly referencing mining applications again for example, many times in underground applications these vehicles are physically manipulated into position in their working environment by for example lowering them down a mine shaft. Points of ingress to the working environment are limited in size such that vehicles have typically been limited to a smaller size so that they can be lowered into the working environment through such a shaft or opening. Where larger vehicles even the size of a conventional pickup truck have been required in such environments it has been known in the past to even see companies lower the vehicle into position down a mineshaft by cutting it into parts and then welding it back together once it is in position. Providing a type of electric vehicle which was modular in assembly would increase the possible available largest sizes of these types of vehicles, which would enhance their commercial attractiveness to these types of customers. It is believed that providing a system of assembly of modular electric vehicles where the entire vehicle is broken down into a series of standardized modules, including frame and structure components through to drive and other systems would have commercial attraction and utility. Rendering the entire vehicle modular, rather than just attachable modular control components or system components on a unitary vehicle is a difference over the prior art.

Developing the idea of an assembled modular vehicle which had the highest amount of flexibility in terms of configuration would require that the component modules as well as the overall vehicle contained the necessary controls and systems to adapt to their deployment in varying configurations. This is again something which has not to date been seen in the prior art and which would render the concept of a modular electric vehicle more commercially attractive insofar as it would not only allow for the maximum number of flexible configurations of vehicles using a lower number of standardized component modules, but would also yield vehicles which were more robust from a field service perspective which again would enhance the commercial attraction of such a vehicle in industrial applications.

SUMMARY OF THE INVENTION

As outlined above the general concept of the present invention relates to the manufacture of a modular electric vehicle using interchangeable vehicle assembly modules. A modular electric vehicle which can be assembled from a plurality of modules will not only allow for maximum flexibility in terms of configurations which can be offered for sale, but also has practical benefits to the user in terms of the ability to disassemble and reassemble the vehicle for simplified service as well as for use in applications where minimal sized routes of ingress to the working areas are available.

Our first embodiment of the invention is a modular electric vehicle which comprises a plurality of interchangeable vehicle assembly modules. The interchangeable vehicle assembly modules are connected by adjoining connecting module surfaces, and they have a central bus and a central network bus connected between and extending therethrough. At least two of the interchangeable vehicle assembly modules are powered vehicle assembly modules which comprise an axis extending between their two axial ends ramped in the direction of travel of the assembled vehicle, and having at least one connecting module surface at an axial end thereof for structural attachment to an adjoining connecting module surface of an adjacent vehicle assembly module. A terminal vehicle assembly module with a powered axle may only have one connecting module surface for attachment to an adjacent module, versus a dual-ended module could be attached in the middle of a completed vehicle.

Power vehicle assembly modules would also each include at least one electrically powered axle, which had wheels, tracks with a light for engaging a surface and moving the assembled vehicle across a lit surface. The module would also include a central power bus which was connectable to the central power bus of adjacent vehicle assembly modules at the adjoining module surfaces, and a central network bus which was also connectable to the central network bus of adjacent vehicle assembly modules at the adjoining module surfaces. A single central network bus and a single central power bus through the assembled vehicle allows for minimal complexity in controls and maximizing the ease of interchangeability of the modules as well as the ease of repair. Each powered module would also include a module controller connected to and capable of controlling the at least one electrically powered axle and connected to the central network bus for communication with the module controllers of other vehicle assembly modules. By including a freestanding module controller within each module, again the interchangeability of modules in the configuration and assembly of different types of finished vehicles is maximized.

At least one of the powered vehicle assembly modules would be steerable by interaction of its module controller with the at least one powered axle thereof. The axle could be made steerable in a number of different ways, either by providing for a central steering action on the entirety of a pass-through axle, or by mounting the wheel or track on each side of the module on a freestanding axle with a freestanding motor, so that the wheels could be individually controlled and steered. In certain circumstances it may also be the case that a steerable axle was not a powered axle and that is also contemplated within the scope of the present invention.

Also in assembly of this finished modular electric vehicle there would be at least one interchangeable vehicle assembly module that included an electrical power source connected to the central power bus of the vehicle. The electrical power source would likely be batteries or some type of an electrical power subsystem which could either be permanently attached or removable. By use of a central power bus, a single electrical power source for the entire vehicle could be used, rather than needing to build-in a separate electrical power source into each powered module.

The vehicle would also include a vehicle controller connected to the vehicle and to the central network bus, which can control the movement and steering of the vehicle by interaction with the module controllers on the powered vehicle assembly modules. Finally, the assembled modular electric vehicle would also include an operator interface which was connected to the vehicle controller or was integral with the vehicle controller, by which an operator could drive and steer the vehicle, or control any attached electrical accessory modules and the like.

The interchangeable vehicle assembly modules of the modular electric vehicle of the present invention could either be terminal vehicle assembly modules with one universal modular surface for attachment to adjacent modules, or they could be bidirectional modules insofar as they had two opposing connecting module surfaces each of which could be attached to an adjacent interchangeable vehicle assembly module. In the case of a terminal interchangeable vehicle assembly module, having only one connecting module surface, that module might include network terminators for the central network bus, or power terminators for the central power bus, such that the power or communications and control on the vehicle could be properly terminated at an end of the vehicle.

In addition to the powered vehicle assembly modules, the modular electric vehicle of the present invention could also include at least one non-powered vehicle assembly module which had an axis extending between its two axial ends oriented in the direction of travel of the assembled vehicle and had at least one connecting module surface and an axial end thereof for structural attachment to an adjoining connecting module surface of an adjacent vehicle assembly module. In the case of a non-powered vehicle assembly module, there would again be a central power bus passing therethrough to the adjacent connecting module surfaces allowing for connection of the central power bus to the central power bus of an adjacent vehicle assembly module in the assembly of the vehicle, and similarly a central network bus would extend therethrough and be connectable to the central network bus of adjacent vehicle assembly modules of adjoining module surfaces as well.

The modular electric vehicle might also include a wireless communications transceiver which was operatively connected to the central network bus which could allow for wireless connection or communication either between the interchangeable vehicle assembly modules, some accessory modules, or even between the completed modular electric vehicle and adjacent modular electric vehicles for control purposes. The operator interface could be connected to the vehicle controller by wireless communication with a wireless communications transceiver. As outlined elsewhere herein, the operator interface and the vehicle controller could also be integrated into a single hardware and software unit, rather than two re-stemming components, and both such approaches are contemplated within the scope of the present invention. As outlined above it is explicitly contemplated that the vehicle controller could control the movement and steering of at least one adjacent modular electric vehicle, via either a wired or wireless control network connection between the vehicles. In such a circumstance, the modular electric vehicle might also include proximity sensors which could sense, and via the vehicle controller and central control network control, the proximity of the controlling modular electric vehicle to the at least adjacent modular electric vehicle being controlled.

At least one of the vehicle assembly modules could also include an accessory module attachment points for the attachment of at least one accessory module to the modular electric vehicle. Various types of accessory modules can be contemplated, including things such as an operator cab, a passenger seating module, a deck surface, a payload box or tank or even a lifting device or the like. There will be many different types of accessory modules or peripherals which can be conceived by those skilled in the art and design of industrial vehicle use and all such approaches are contemplated within the scope of the present invention insofar as any such attachment or peripheral could be rendered attachable to the remainder of the vehicle by the placement of a properly standardized pattern of accessory module attachment points thereon.

Attachable accessory modules could be used to in combination yield an operator cab, passenger seating module or other approach with respect to the vehicle. In other circumstances, a non-powered or powered vehicle assembly module could itself comprise an operator cab, passenger seating module or other accessory integral therewith and all such approaches are also conceived and contemplated to be within the scope of the present invention—insofar as any such integrated modules were created, any necessary connections with the central control network bus and the central power bus of the overall vehicle could be made as well in the manufacture of such modules.

In the circumstances where the system and the modular electric vehicle of the present invention was to be manufactured in a way that it could allow for the interchangeable attachment of various accessory modules, at least one of the vehicle assembly modules could also include at least one accessory module network connection for the connection of an accessory module to the central network bus of the assembled vehicle, or could also include at least one accessory module power connection for the connection of at least one accessory module to the central power bus and to power those accessory modules. In the case of the attachment of accessory modules to the assembled vehicle, the vehicle controller could also be allowed to control any such powered accessory modules on the accessory modules via the central control network and the attendant modifications of the vehicle's software on the vehicle controller and associated operator interface.

The vehicle controller could be aware of the configuration of the vehicle assembly modules in the assembled vehicle either by the selection or programming of the finished configuration by an operator at the vehicle controller or the operator interface, or in other embodiments, the modules could be manufactured in such a way that the individual module controllers on the modules could provide appropriate feedback to the network and the vehicle controller such that the vehicle controller could pull the central control network on the vehicle in its assembled state to determine the configuration, ordering and placement of various types of vehicle assembly modules and accessory modules within the assembled vehicle and to either advise the operator of an inappropriate configuration if the configuration was not something that the vehicle controller held the appropriate software to control, or alternatively to select the appropriate control software and operator interface software for use with that particular configuration of the vehicle. Either a manual entry approach or a network polling approach to the selection of the appropriate control software is again contemplated within the scope of the present invention.

In order to maximize the speed and efficiency with which the vehicle could be assembled, the connections of the central network bus or the central power bus between adjacent vehicle assembly modules could be effected, in wired connection circumstances, using keyed cable connections to allow for immediate proper connection of cabling in the vehicle. As outlined above, the central network bus between the adjacent vehicle assembly modules could also be connected or effected by wireless transceiver communication between the modules and the central network bus in a case where there was a wireless transceiver on the vehicle.

Dependent upon the assembly of the overall modular electric vehicle, the operator interface could allow the operator to select from a plurality of user selectable steering modes depending upon the basis on which it would be used.

As outlined above, each connecting module surface of the interchangeable vehicle assembly modules of the present invention would contain a symmetrical attachment mechanism which would allow for the interchangeable connection of that connecting module surface with the connecting module surface of another adjacent vehicle assembly module. The various types of attachment points which maximize the structural integrity of the completed vehicle can be understood and contemplated within the scope of the present invention.

Also disclosed in addition to the modular electric vehicle of the present invention is a central control network for use in the modular electric vehicle. The central control network comprises a means of controlling a plurality of interchangeable vehicle assembly modules which are connected by adjoining connecting module surfaces and have a central power bus. At least two of the interchangeable vehicle assembly modules in that vehicle are powered vehicle assembly modules which comprise an axis extending between its two axial ends oriented in the direction of travel of the assembled vehicle and having at least one connecting module surface at the axial end thereof for structural attachment to an adjoining connecting module surface of an adjacent vehicle assembly module, at least one electrically powered axle, and a central power bus connectable to the central power bus of adjacent vehicle assembly modules and adjoining module surfaces. There is also in at least one of the powered vehicle assembly modules a steerable axle, which is steerable by interaction of the module controller with the at least one powered axle of that module for the purpose of steering the assembled vehicle, and at least one of the interchangeable vehicle assembly modules includes an electric power source connected to the central power bus of the vehicle to provide power to the entirety of the vehicle by a central power bus. The central control network of the present invention itself comprises a central network bus extending through each interchangeable vehicle assembly module and connectable at each connecting module surface to the central network bus extending through adjacent vehicle assembly modules. There is also a module controller within this network within each vehicle assembly module, connected to the central network bus and the central power bus and capable of controlling any power or steering components thereon. There is also a vehicle controller which is a part of the control network which is connected to the assembled vehicle and the central network bus which can control the vehicle by interaction with the module controllers on the vehicle assembly modules and by extension may control the powered axles or other accessory modules thereon, and an operator interface is connected to the vehicle controller by which an operator can drive and steer the vehicle. The operator interface and the vehicle controller could be separate components or could be integrated.

The central control network of the present invention might also allow for the control of accessory modules connected to the remainder of the vehicle, wherein the module controller on at least one vehicle assembly module is connected to an accessory module requiring operator control and the vehicle controller allows an operator to control that accessory module through the operator interface.

The central network bus connection in the central control network of the present invention between adjacent vehicle assembly modules could be wireless or wired. In the case of a wireless connection, the modules would have to contain at least one wireless transceiver operatively connected to the central control network for the sake of communicating with the other modules and necessary components thereon.

Another aspect of the present invention is an interchangeable vehicle assembly module for use in the assembly of the modular electric vehicle. The module comprises an axis extending between its two axial ends oriented in the direction of travel of the assembled vehicle and having at least one connecting module surface and an axial end thereof for structural attachment to an adjoining connecting module surface of an adjacent vehicle assembly module. There is a central power bus extending therethrough, connectable to the central power bus of adjacent vehicle assembly modules and adjoining surfaces, and a central network bus which is connectable to the central network bus of adjacent vehicle assembly modules and adjoining surfaces. There is also a module controller connected to the central power bus and the central network bus. The module controller could comprise anything from a basic terminator in a one-ended module, through to a more elaborate electronic controller capable of controlling the power components on a powered axle or the like.

The interchangeable vehicle assembly module of the present invention could have a single connecting module surface for attachment at an end of the assembled vehicle, being a terminal vehicle assembly module, or could have two connecting module surfaces being more of a bidirectional module which could be attached at different places within an assembled vehicle.

The interchangeable vehicle assembly module could also include at least one powered axle thereon with ground engaging means, capable of moving the vehicle across a working surface. This powered interchangeable vehicle assembly module would have its powered axle operatively connected to the central power bus and the central network bus and capable of being controlled by the corresponding module controller, in communication with the vehicle controller. The interchangeable vehicle assembly module if it included at least one powered axle could also be steerable, allowing for steering of an assembled vehicle including the module.

The interchangeable vehicle assembly module of the present invention could also include an electric power source connected to the central power bus such that it could provide power to an entire assembled modular electric vehicle including that module.

The interchangeable vehicle assembly module could also include one or more accessory module attachment points for the attachment of at least one accessory module thereto. To accommodate the attachment and control of various accessory modules the interchangeable vehicle assembly module might also include at least one accessory module network connection for the connection of an accessory module to the central network bus, or at least accessory module power connection for the connection of an accessory module to the central power bus.

Each connecting module surface of the interchangeable vehicle assembly module of the present invention could contain a symmetrical attachment mechanism which would allow for the interchangeable connection of that connecting module surface with the connecting module surface of one or more other vehicle assembly modules.

DESCRIPTION OF THE DRAWINGS

Selected preferred embodiments of the present invention will now be described with reference to the accompanying drawings. In the accompanying drawings.

DETAILED DESCRIPTION OF ILLUSTRATED EMBODIMENTS

Figure 1:
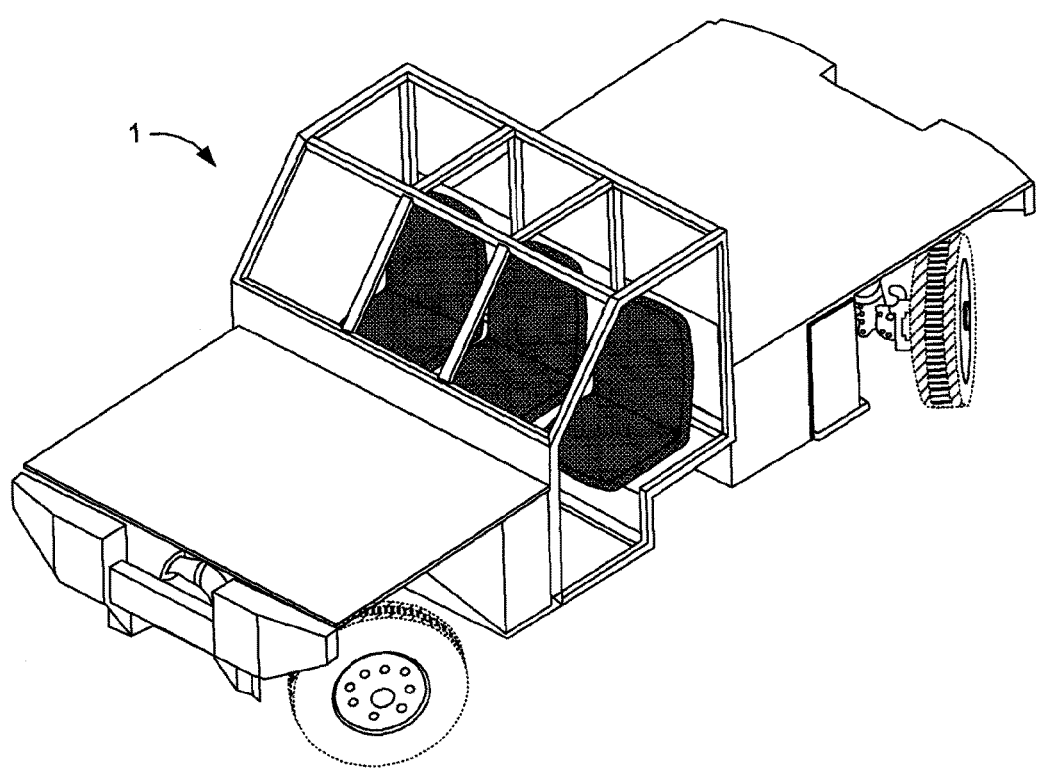
FIG. 1 is a perspective view of one embodiment of a modular electric vehicle of the present invention, with two steering powered vehicle assembly modules.

As outlined above, the overall concept of the present invention is a modular electric vehicle comprised of a plurality of discrete vehicle assembly modules. The combined integrated control system of the vehicle, comprised of a network of controllers on the modules connected by a central network bus, would be aware of the module configuration of the vehicle in total and would make available to the vehicle operator the appropriate control configuration to operate the vehicle in its assembled modular form.

Vehicle Requirements:

There are a number of basic concepts which are contemplated in the design of the modular electric vehicle of the present invention. It is desired to achieve a system where, either in factory or on site, a modular electric vehicle can be assembled from a plurality of interchangeable vehicle assembly modules.

In considering this approach in comparison to a pre-existing vehicle type, it can be thought of as dividing the prior art vehicle into a plurality of modules which can be attached together to achieve the completed vehicle, either for the sake of allowing for compact on site assembly, and/or for the purpose of allowing the construction of vehicles of varying types, sizes and configurations with a minimized manufacturing footprint. For example, it may be possible to develop thirty different vehicle configurations for sale, using only 6 or 8 different vehicle assembly modules. This will allow for maximized manufacturing flexibility and lowered manufacturing costs, while maximizing the number of vehicle types which can be offered to customers for sale.

Given that the primary applications for these types of vehicles involve industrial scenarios in which either the manufactured size of the modules will permit the on-site assembly of different or larger vehicles than in the past, as well as that in many industrial applications there are safety concerns with the use of internal combustion engines, electricity is contemplated to be the primary power system to be used. The modular manufacture and assembly method of the present invention could be used with gas or other internal combustion powered vehicles also, but with more limited effect.

In many industrial applications which might include operations in tight or confined work areas, turning radius of the vehicle will also be a concern. Steering components and methodology need to accommodate the need for tight turning radii—in fact in considering tight turning radii the preferred steering approach for a multi-axle vehicle will likely be a crab steering approach, where all of the wheels on the vehicle steer, rather than just a steering axle at one end of the vehicle.

Modular Electric Vehicle:

As outlined above and will be discussed in further detail below, the first embodiment of the present invention is a modular electric vehicle which is comprised of a plurality of interchangeable vehicle assembly modules. A modular electric vehicle is assembled from a plurality of discrete interchangeable vehicle assembly modules. The modular electric vehicle of the present invention has at least two axles with ground-engaging wheels, tracks or the like for the purpose of driving the vehicle across a work surface. At least one of the axles must include steerable wheels or the ability to steer the vehicle. When we refer to a plurality of modules we mean at least two or potentially more than two. At least two of the interchangeable vehicle assembly modules used in the construction of a modular electric vehicle in accordance with the present invention would be modules including a powered axle. At least one of those powered axle modules would be steerable, to provide for the ability to steer the overall vehicle once assembled.

Really any number of interchangeable vehicle assembly modules in excess of one could be used to assemble a finished vehicle in accordance with the remainder of the method. The type of modules which could be used also varies. As will be discussed in further detail below there are contemplated to be powered modules and non-powered modules, and some of the powered modules will be steerable to allow for steering the assembled vehicle. Beyond this however, the finish of the vehicle assembly modules could vary in terms of their function as well. Some modules might have seats or operator cabs their own, others might include a freight deck or a passenger area, or even very purpose built or function specific equipment could be manufactured into a module which could then be assembled into finished vehicles.

Figure 2:
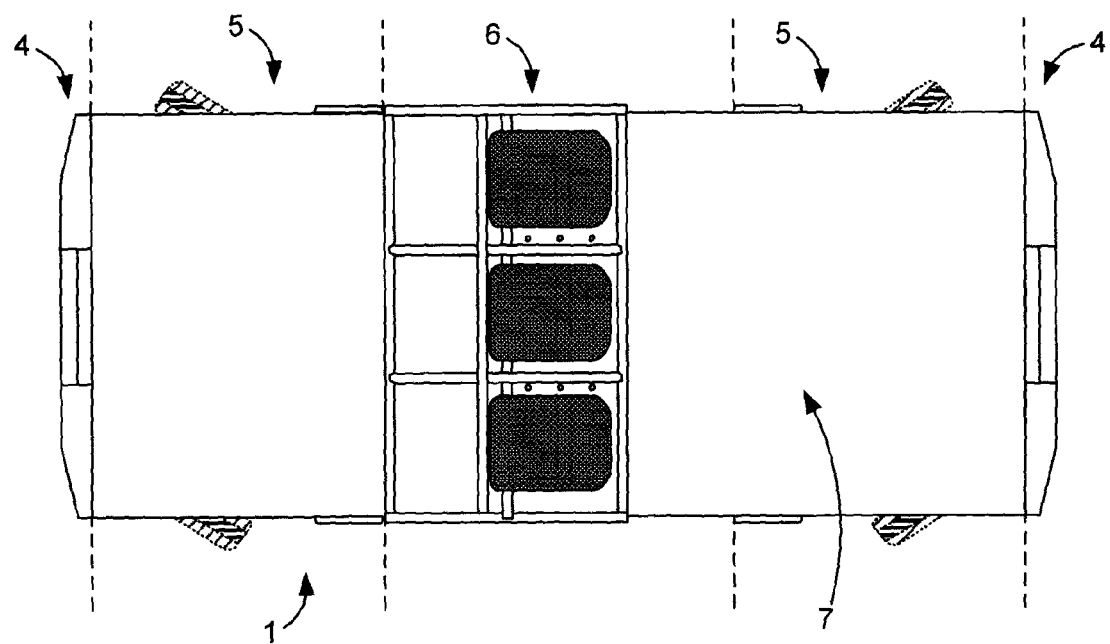
FIG. 2 is a top view of the embodiment of FIG. 1.
Figure 3:
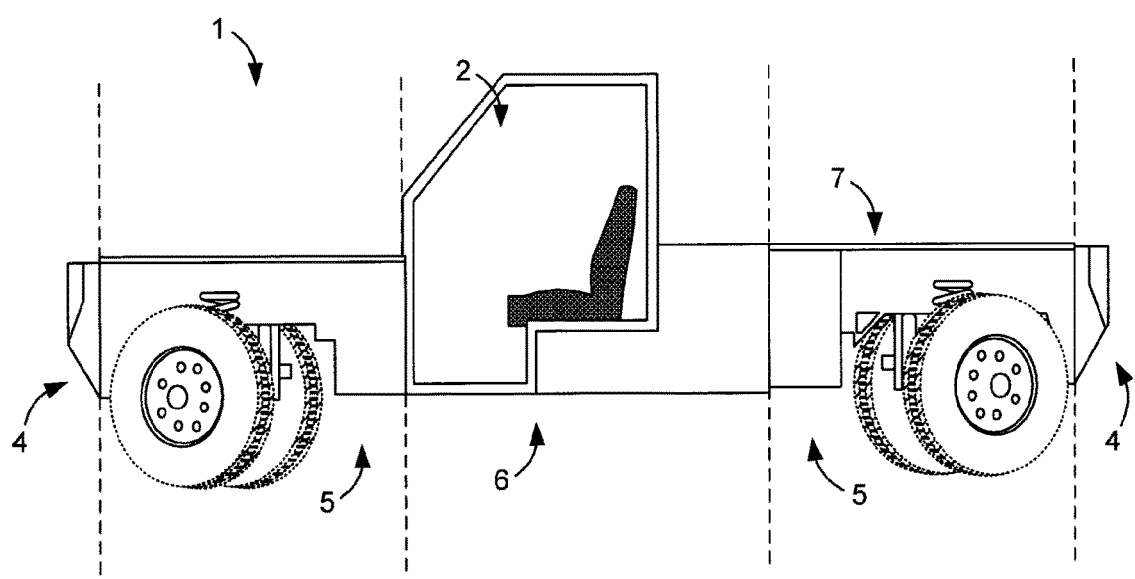
FIG. 3 is a side view of the embodiment of FIG. 1.

To outline the assembly of a basic modular electric vehicle, we refer to FIGS. 1 through 3 which demonstrate a basic modular electric vehicle assembled in accordance with the method of the present invention. There is shown a modular electric vehicle 1 in accordance with the present invention which in this particular case takes the finished format of a small transport truck with a cab 2 for seating and a small transport deck 3.

Referring to the side view of FIG. 3 the five vehicle assembly modules used in the construction and assembly of this particular truck 1 can be seen. From the front of the vehicle 1 to the rear, as defined by the forward facing of the operator cab, there is shown a terminal vehicle assembly module 4 which is a bumper assembly, a steerable power vehicle assembly module 5 which in this view comprises the front axle portion of the vehicle 1, a central operator cab module 6 which is a non-powered vehicle assembly module, followed by a second steerable power vehicle assembly module 5, which is the same as the front axle module but flipped around for opposite connection in the assembly of the vehicle 1. The final vehicle assembly module is a second terminal bumper assembly 4.

A deck surface 7 can also be seen. The deck surface 7 could either be a part of the operator cab module 6 which would drop into place over top of the rear axle module 5, or could be an attachable accessory module which could be attached to the remainder of an assembled vehicle 1.

The number of combinations of different modules which could be assembled in accordance with the underlying premise of the present invention to yield different combinations and different completed vehicle configurations will be obvious to those skilled in the art and are all contemplated within the scope hereof. Some additional assembled modular vehicle combinations will be shown in further detail below.

Interchangeable Vehicle Assembly Modules:

A modular electric vehicle could be assembled from a combination of powered or non-powered modules with connecting module surfaces and pass through bus connections, and that various of the modules could easily be interchanged in their location within the vehicle by simply moving and reattaching them. Ideally the control system of the vehicle, connected by a central network bus, would recognize the reconfiguration of the modules and adjust the control system accordingly or notify the operator if an invalid configuration had been made. For example, referring to the truck of FIGS. 1 to 3, the operator module 5 could be moved to the front of the vehicle, and the front and back powered vehicle assembly modules 4 connected together in close proximity, to provide a different load support beneath the transport deck for example, or if it was simply desired to place the operator control position at the very front of the vehicle. Reconfiguration or alteration of the assembly of the vehicle could again be done either in the field or at the location of manufacture but generally speaking simplicity of this type of an assembly method and its flexibility in terms of the number of different available configurations with a fixed number of vehicle assembly modules being available, will be seen and understood.

Again referring to the truck of FIGS. 1 to 3 the interchangeability of the modules and the connecting module surface concept can also be seen with respect to the two powered vehicle assembly modules 4—it can be seen that the front powered vehicle assembly module 5 and the back powered vehicle assembly module 5 have been flipped around in their orientation to the remainder of the vehicle such that the axles are at the distal ends of the vehicle. It will be seen from the otherwise symmetrical shape of those modules that it is the same module being used in both cases and simply being reoriented for assembly. The module controller in each of those powered vehicle assembly modules could then either automatically or through an operator or assembly interface be configured to recognize the orientation of those modules 5 in relation to the remainder of the vehicle 1 and adjust the control appropriately. For example the vehicle controller could then recognize the location of the axles on the vehicle in relation to the center of rotation for steering purposes, and adjust the nature of the control inputs and outputs appropriately to properly and efficiently steer the vehicle as assembled or drive the vehicle as assembled. If another powered vehicle assembly module 5 with another powered axle was added to the vehicle, the vehicle controller would again either automatically or by operator input be aware of the presence of that additional axle and again have the necessary program in place to either recognize that as an appropriate or acceptable control configuration and allow for control appropriately thereof, or could alternatively notify the assembly or the operator that the configuration of the vehicle in that fashion was not one that was accepted or programmed and that a change in vehicle configuration was required. Notifying the operator of these types of configuration issues is something that is contemplated might take place within the scope of the present invention, since the modular nature of this electric vehicle lends itself to reconfiguration in the field on occasion to meet alternate purposes.

There are a number of different underlying characteristics of different modules for assembly of electric vehicles in accordance with the present invention and it is desired to summarize those in support of the remainder of this specification.

Figure 4:
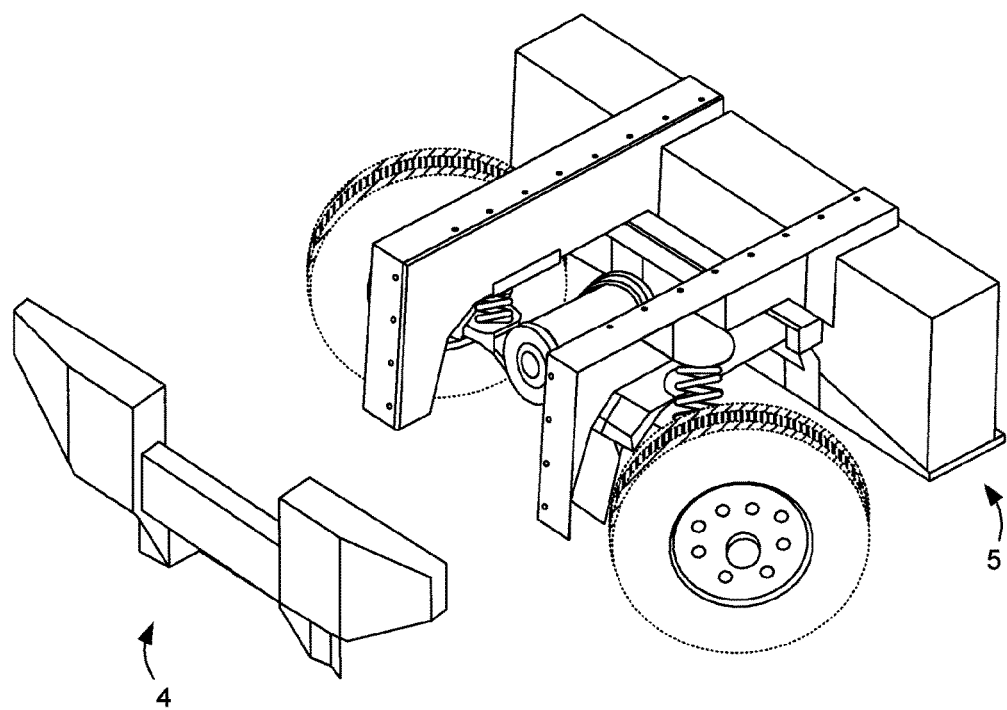
FIG. 4 is a perspective view of two interchangeable vehicle assembly modules.

Firstly, each of the vehicle assembly modules contemplated has an axis—which generally speaking is along the direction of travel of the finished assembled vehicle—for reference purposes. The two ends of the vehicle assembly module will correspond to the two ends of that axis, and each axial end of each module will define a module surface. Referring for example to FIG. 4 there are shown two exploded vehicle assembly modules of the assembled modular electric vehicle of FIGS. 1 to 3, being a terminal bumper module 4 and a powered axle module 5. The first distinction between vehicle assembly module types of the system of the present invention is to distinguish between terminal vehicle assembly modules and two ended vehicle assembly modules.

The terminal vehicle assembly module 4, as shown in this Figure, will be a module which has one universal connecting module surface and axial connection end to the module, and the second axial end is intended as an outward facing or terminal end of the module—i.e. it does not include a universal connecting module surface at its second end and rather at its second includes an outer face for the end of the vehicle with no universal attachment points, and the various buses within the vehicle (communications, power etc.) would be terminated within the module rather than providing pass-through connections at both ends of the module. Thus with a terminal vehicle assembly module such as the bumper module 4 shown, the end of a completed assembled electric vehicle would be provided from a cosmetic and functional perspective, insofar as a finished as required "end" would be mounted to the vehicle, and the various service buses within the completed vehicle would be terminated in such a module—for example, it might be required to apply a proper terminal to the axial end of the network bus within the assembled vehicle for example, for the vehicle to function properly. The first distinction then between types of vehicle assembly modules which could comprise a completed assembled electric vehicle in accordance with the present invention are terminal, or single ended, vehicle assembly modules, in terms of the number of connecting module surfaces or ends provided, versus two-ended vehicle assembly modules which would provide the necessary universal connecting module surface and bus connections at both axial ends of the module to allow for placement of the module anywhere in a completed assembled modular electric vehicle rather than just at one end thereof.

It will be understood that certain embodiments of the completed modular electric vehicle of the present invention, and vehicle assembly modules, could use only two-ended vehicle assembly modules to minimize the number of required module types. It might be possible that either the universal attachment points for the attachment of an adjacent vehicle assembly module could be manufactured in such a way as to not pose a safety threat or utility hazard if left disconnected to an adjacent module, and the internal conduits or bus connections for services between the modules of an assembled electric vehicle could also be optionally terminated using an attachable or optional terminal of some appropriate type—this approach would remove the need for terminal vehicle assembly modules, although it is contemplated that for example the use of bumpers on a vehicle etc. would most often be desired by the end customer and the attachment of a basic terminal vehicle assembly module such as a terminal bumper assembly would be simpler than manufacturing a larger terminal module such as a terminal powered module. Either such approach is contemplated within the scope of the present invention—either the use of terminal vehicle assembly modules to finish or cap the assembly of a modular electric vehicle in accordance with the remainder of this system, or the production and use of interchangeable vehicle assembly modules that can be used in either a terminal or two-ended fashion.

Connecting Module Surfaces:

As outlined above the key to the assembly of a modular electric vehicle in accordance with the method of the present invention is that the variety of vehicle assembly modules which are created for this purpose, either powered or non-powered, need to have at their axial ends universal connecting module surfaces which will allow for the interchangeable mating of the universal connecting module surface of any vehicle assembly module manufactured in accordance with the system and method of the present invention to another adjacent vehicle assembly module. In the case of the terminal vehicle assembly module with a finished surface at one end to face outwardly from the remainder of the vehicle in the direction of travel, either at the front of the rear of the vehicle, there would only be a single universal connecting module surface. In the case of the two ended vehicle assembly module which could be used in any location within the assembly of a modular electric vehicle in accordance with the present invention, both of the two axial ends of the module, perpendicular to the direction of travel of the vehicle, would have the connecting module surfaces thereon. The universal connecting module surface or universal attachment hardware and joint methodology which is developed for use in accordance with the method of the present invention would ideally accommodate not only the adjacent connection of the front of one module to the back of another module, but also would contain appropriately mirrored attachment points or hardware that would allow for a module to be joined from either end thereof to either end of an adjacent module—for example the front to the front or the back to the back. In the example of the modular electric truck shown in FIGS. 1 to 3, the powered vehicle assembly modules 5 are actually, as can be seen, flipped around and connected in this fashion—both of those powered vehicle assembly modules 5 are the same module, simply connected to the remainder of the vehicle in an opposing facing direction to the direction of travel of the vehicle.

In addition to the fact that the hardware or latching mechanism provided on each universal connecting module surface would ideally allow for the connection of either end of an adjacent two ended vehicle assembly module, the connection mechanism or hardware would need to be sufficiently rigid or strong to allow for the function of the vehicle particularly for industrial vehicles intended to carry a load or the like. Many different types of clamping or latching mechanisms which would accomplish this objective of providing mirrored attachment points are mechanisms for the interchangeable aspect of connectivity, along with providing sufficient strength for a loadbearing vehicle or the like, will be understood to those skilled in the art of vehicle frame and structure design and any type of clamping or hardware mechanism which accomplishes the objectives of the mirrored and universal connecting module surface requirements along with providing sufficient strength for the types of vehicles which would be manufactured or assembled using these modules are all contemplated within the scope of the present invention.

Another aspect of the specific nature of the hardware connections which are developed would ideally be that they allowed for quick and relatively simple connection of the modules to each other, rather than requiring a significant amount of assembly time more specific and special tools or the like. The central power bus connections and the central network bus connections between adjacent modules could actually form a part of the attachment hardware on the connecting module surfaces between the modules as well.

Terminal Versus Bidirectional Vehicle Assembly Modules:

The vehicle assembly modules, both non-powered and power in nature, could also be terminal or dual-ended. A terminal vehicle assembly module would basically be capable of connection only at one connection end to an adjacent vehicle assembly module—such that it could for example be mounted at the end of a vehicle and might include a bumper or the like. A dual ended vehicle assembly module would have structural attachment points, as well as pass-through bus connections, at each end of the module, being the connection ends, so that the dual ended vehicle assembly module could be connected at each of its ends to an adjacent vehicle assembly module, either terminal or dual ended itself, and powered or non-powered in nature.

It is specifically contemplated that a terminal vehicle assembly module could be manufactured which might be fairly small in size and might actually simply provide a terminal attachment for use with a dual ended vehicle assembly module in accordance with the remainder of the system such that for example it would effectively comprise a Or a bumper or the like which could be attached to the end of an already assembled modular electric vehicle in accordance with the remainder of the present invention. These types of terminal vehicle assembly modules would allow for maximum flexibility in the configuration and assembly of modular electric vehicles in accordance with the system and method of the present invention.

Each vehicle assembly module will have in approximately the same universal location at each connection end thereof the necessary connections to allow for the pass-through connection of these various buses or services through the completed assembled modular electric vehicle.

Powered Vehicle Assembly Modules:

The next distinction in the types of vehicle assembly modules which could be developed or used in accordance with the remainder of the vehicle assembly method and methodology of the present invention is the distinction between powered vehicle assembly modules and non-powered vehicle assembly modules. A powered vehicle assembly module is contemplated to be a vehicle assembly module which includes vehicle power equipment for use in the travel or drive of the finished assembled modular electric vehicle. This would comprise either at least one pass-through axle with wheels or other locomotion aids such as tracks or the like at the ends thereof, or alternatively powered wheels mounted at either side edge of the module with the wheels mounted in individually powered fashion oriented in the direction of travel of the finished vehicle. In a powered vehicle assembly module with a pass-through axle, there might be a single electric motor and power transfer components to drive the axle and wheels, versus in a powered vehicle assembly module with independently mounted wheels it is contemplated that each wheel might be connected to its own electric motor with all of the motors on the module being connected to the central power and network bus of the module and the vehicle. Either approach is contemplated within the scope of the present invention.

While we speak in terms of axles which support or engage the surface-engaging wheels or tracks on a powered vehicle assembly module, it will be understood that the concept of axles in these modules does not only contemplate a straight through unitary axle as might have been understood in a conventional sense. The axles on the powered vehicle assembly modules could also comprise a mounting axle and steering and power system for individual wheels on the module (and in fact this will the most likely implementation of the powered vehicle assembly modules)—rather than a straight through axle with a single power converter from an electric motor (which might be preferred in some circumstances where a non-steering powered vehicle assembly module was being manufactured), the individual wheels on the powered vehicle assembly modules might be individually powered by discrete electric motors in others including in steering modules—either such axle approach is contemplated within the scope of the present invention.

Each powered vehicle assembly module is contemplated to be self-contained from a power perspective insofar as each powered vehicle assembly module would contain its own drive power as well as its own electric charging and power charging and storage system. By providing self-contained power systems on each powered vehicle assembly module, the assembly of a vehicle with multiple powered vehicle assembly modules will results in the inclusion of multiple onboard drive and power systems—the availability of more power in storage on the vehicle, as the number of axles and driven wheel or other power requirements increases, is desirable.

Each powered vehicle assembly module would contain at least one axle with an integrated drive and power, as well as an electrical power storage or battery system, along with a module controller for the control of the driving and steering of the at least one steerable axle. Using standardized attachment points between the various modules along with a central network bus which allowed communication between the module controllers of each module would allow for the flexible assembly of various electric vehicles of different configurations using an inventory of standard modules.

While it is contemplated that the best implementation of the powered vehicle assembly modules of the present invention would be to include the charging and power storage system on each powered vehicle assembly module such that the necessary batteries and stored power would be available on a module by module basis to meet the power needs of the drive or other components attached thereto, it will also be understood that in certain embodiments, while the drive system or drive components would be included within each powered vehicle assembly module there may be a desire in certain cases to use a single charging and power storage or battery system on the vehicle, or less than one charging system for each powered vehicle assembly module, and to simply connect electric drive components of each powered vehicle assembly module to that central battery system by a central power bus on the vehicle.

Also integral with each powered vehicle assembly module would be a module controller operatively connected to the power and drive equipment on the module as well as to the controllers on other modules and the remainder of the vehicle via a central network bus. The controller could generate the necessary control outputs to the motors or drive equipment on the module when the overall control of the vehicle or movement of the vehicle in a particular fashion was called for via the central network bus. By placing an integral controller on each drive module, assembly and control of the finished vehicle is simplified. The controllers on each drive module could recognize the presence of other similar controllers on the communications network of the vehicle as well as with proper network configuration recognize their relative position in relation to the remainder of the vehicle such that, with appropriate software stored within the memory of the controller or controllers, the overall drive control of the vehicle could automatically be reconfigured or adjusted on the fly to match the configuration of the modules together in the vehicle. One of the controllers on one of the drive modules might become the master, with the remainders being slaved to that controller, from the purpose or perspective of the overall control interface of the vehicle, or alternatively each of the controllers on the drive modules might be slaves to a single added vehicle controller which could just plug in a modular fashion into the central communications and power bus of the vehicle somewhere thereon. Either such controller network approach is contemplated within the scope hereof as well, and will be described in further detail with respect to add functionality of the unit elsewhere below.

Steerable Vehicle Assembly Modules:

A further distinction in the types of powered vehicle assembly modules which could be used on modular electric vehicles in accordance with the remainder of the present invention would be steerable or non-steerable powered vehicle assembly modules. A steerable powered vehicle assembly module would be a module which could be used to, singly or in combination with others, steer the completed assembled modular electric vehicle as it drives across a surface. It may be the case that only one axle of the vehicle and thus one powered vehicle assembly module needed to be steerable, or it may be the case that the axle and drive equipment on more than one powered vehicle assembly module of the vehicle is steerable to allow for example for more maneuverability or the like. For example referring to the truck embodiment of the electric vehicle of the present invention which is shown in FIGS. 1 to 3, it can be seen that the wheels on each of the two powered vehicle assembly modules on that vehicle are steerable which would allow for the highest possible maneuverability. The wheels of each of those two powered vehicle assembly modules being steerable independently, the controllers on each of those powered vehicle assembly modules would control the steering of the vehicle as well as its driving power and upon receipt of a steering indication from the operator controls of the vehicle would initiate the necessary steering control on the power equipment on each of those powered vehicle assembly modules to accomplish the desired steering effect of the vehicle. If the powered vehicle assembly modules used tracks instead of tires, which is not likely but is possible as outlined elsewhere herein, the necessary adjustment to the steering control of the module, using methodologies known to those skilled in the art of the manufacture of tracked vehicles, would be implemented. In any event it is contemplated that both steerable and non-steerable powered vehicle assembly modules could be used in the assembly of the modular electric vehicle of the present invention dependent upon the desired functionality of the completely assembled vehicle. [As is also outlined following, it may be the case that either a steerable or non-steerable wheeled module which did not have a power system thereon, such that it would effectively comprise a trailing or supporting but non-driven axle on the vehicle could also form a part of the structure of the vehicle.]

Non-Powered Vehicle Assembly Modules:

The final type of an interchangeable vehicle assembly module which is contemplated within the inventory which could be used to assemble the completed modular electric vehicles of the present invention are non-powered modules. Non-powered modules are contemplated to be any module, either terminal or two ended, which did not include an electric drive and power system connected to an axle or wheels engaging the surface of the work area. Referring to the truck of FIGS. 1 to 3, the non-powered modules shown there are the terminal bumper assemblies, and the central operator module. Another type of a non-powered module which is contemplated is a non-powered module with an axle or wheels engaging the surface, which could be steerable or otherwise.

It will be understood that the general concept of a non-powered module, being any module which could be used in the assembly of the modular electric vehicle of the present invention by having either in the terminal form one, or in a two ended form two, connecting module surfaces and pass through bus connections capable of being connected to adjacent vehicle assembly modules, either powered or non-powered, is contemplated within the scope of the present invention. The powered and non-powered modules would once assembled basically form the frame or the structure of the finished vehicle, and additional modules or components can also be attached to the top surface of those modules to provide even further flexibility. For example in the circumstance of the truck of FIGS. 1 to 3, additional components could be attached to the top of the transport deck 7 for example to allow for the further flexibility of assembly of the vehicle and to further increase the number of finished configurations available.

There are numerous different types of non-powered vehicle assembly modules which can be contemplated for assembly into a finished vehicle in accordance with the method of the present invention. What is contemplated from the overall perspective of a non-powered vehicle assembly module is a module which has matching frame or substructure and other components to the powered vehicle assembly modules which will be used in the assembly of the vehicle, such that the non-powered vehicle assembly module can be connected at its two axial ends to two adjacent vehicle assembly modules, which might be power or non-powered modules. The non-powered vehicle assembly modules would likely have either operator function or transport purpose—for example the module might include an operator cab which provided a seating area for the operator of the vehicle, along with controls for operation of the vehicle which would interface with the remainder of the controls on the assembled vehicle through the central network bus. It may also be the case that the non-powered vehicle assembly module might include a plurality of seats to create a human transport vehicle, or a transport deck or box or the like. Any type of a vehicle assembly module which did not include a power system, as is contemplated with the powered vehicle assembly modules outlined above, is contemplated within the scope of the non-powered modules and would all be within the scope of the intended present invention. While it is contemplated that in the circumstances of most industrial applications it would be desired for all of the axle bearing modules to be powered vehicle assembly modules with integrated power systems, it will be also understood that an axle bearing non-powered vehicle assembly module might also be manufactured. In such a circumstance, either with a pass-through axle or with individually steerable wheels, that vehicle assembly module could be manufactured in accordance with the remainder of the present invention and could in a drag along non-powered fashion provide ground support and wheels for the assembled modular electric vehicle.

Central Power Bus:

As outlined throughout this document, a central power bus passing through all of the modules in the assembled vehicle will be helpful from the perspective of sharing power between modules as one module might require more power. The central power bus might also be used from the perspective of allowing for recharging of the electrical batteries in multiple modules of the vehicle by the connection of the charger to one point on the central power bus and using it for charging purposes. The benefits of a central power bus through the entire vehicle be understood those skilled in the art of electrical power and electrical circuit design.

Any type of a cable connector or the like which could be used to connect the central power bus between adjacent modules one the modules were connected is contemplated for the purposes of connecting the two adjacent modules and the central power boss. As outlined in further detail below, the use of keyed cable connections may be especially beneficial from the perspective of providing for the quick attachment of the power bus between adjacent modules. Any peripheral or component on any module which required power could be connected to the central bus—for example the module controller could be connected to the central power bus either for controlling certain aspects of the power distribution process, or simply because the controller itself required power. Lights or other accessories on the module can be connected to the central power bus, as could or would be the vehicle controller, responsible for the overall control of the vehicle by distribution of control signals to all of the module controllers on the central control network bus.

One or more of the modules in the assembled vehicle might also include power distribution ports from which accessories or peripherals can be connected to the central power bus for the purpose of powering those as well.

Central Network Bus:

In addition to the need for the development and implementation of connecting module surfaces and attachment hardware at the attachment ends of each vehicle assembly module, either on both ends at opposing ends of the direction of travel of the vehicle on a two ended vehicle assembly module, or at one end perpendicular to the axis or direction of travel of the vehicle on a terminal vehicle assembly module, is that there will be the need for a central control network and bus to extend physically through each vehicle assembly module and again allow for some type of universal connection at each universal connecting module surface of each vehicle assembly module.

As outlined above, and most particularly understood with respect to the powered vehicle assembly modules of the vehicle which include drive motors and a power charging and storage system, each powered vehicle assembly module would have its drive components and power components connected to a central network bus. There might be a local module controller physically mounted within the module which could be slaved to a vehicle controller within the vehicle once assembled.

The vehicle controller as designated within the assembled vehicle would, either by a power up diagnostic on the vehicle or by manual configuration during the process of assembly of a modular electric vehicle within the scope of the remainder of the present invention, identify the number, orientation and relative location of all of the vehicle assembly modules within the assembled modular electric vehicle. The control programming for operation and driving of the vehicle, and steering the vehicle, could then be executed by the controller which would by the central control network on the vehicle feed the necessary control signals to the individual powered vehicle assembly modules as required. The operator controls for the vehicle—for example an operator cab with a steering wheel and/or speed and directional controls etc. would also be connected to the central controller network and would feed their control inputs to the vehicle controller such that it could based upon the desired and safe operator inputs actuate the powered vehicle assembly modules and the individual power drive related to their axles and wheels to move the vehicle in a desired direction, as well as required executing the necessary control of the vehicle to steer it in a particular direction—for example based upon one or more steerable powered vehicle assembly modules being present on the vehicle, if the operator provided a steering input, the controller would signal the steerable powered vehicle assembly modules appropriately to execute the desired steering movement.

In addition to a central control network or network bus on the assembled vehicle, which would be connected or assembled by way of connection between the communication network on the individual modules as they were assembled adjacent to each other, it may also be the case that it was desired to have other consolidated circuitry present on the unit. The power and network bus would also be preferable for circumstances where add-on attachments or components were provided or attached to the assembled vehicle, such as the telehandler shown which would require power as well as a control interface if it was to be controlled in a consolidated way with the remainder of the vehicle. There may also be circumstances within which it was desired to run a central hydraulic conduit throughout the unit, fed from one or more hydraulic pumps located on individual modules, or compressed air conduits or the like—for use on brakes or other accessory purposes. As outlined elsewhere herein, one of the key points would be that these various central conduits or buses would need to be terminated at the ends of the assembled vehicle—this could be done either with the attachment of the terminal vehicle assembly module which included termination components for the various bus or conduit connections therein, or it may also be the case that add-on terminators could be provided for installation on one connecting module surface or one set of bus or conduit connectors on a two ended vehicle assembly module, where no terminal modules were used.

Figure 17:
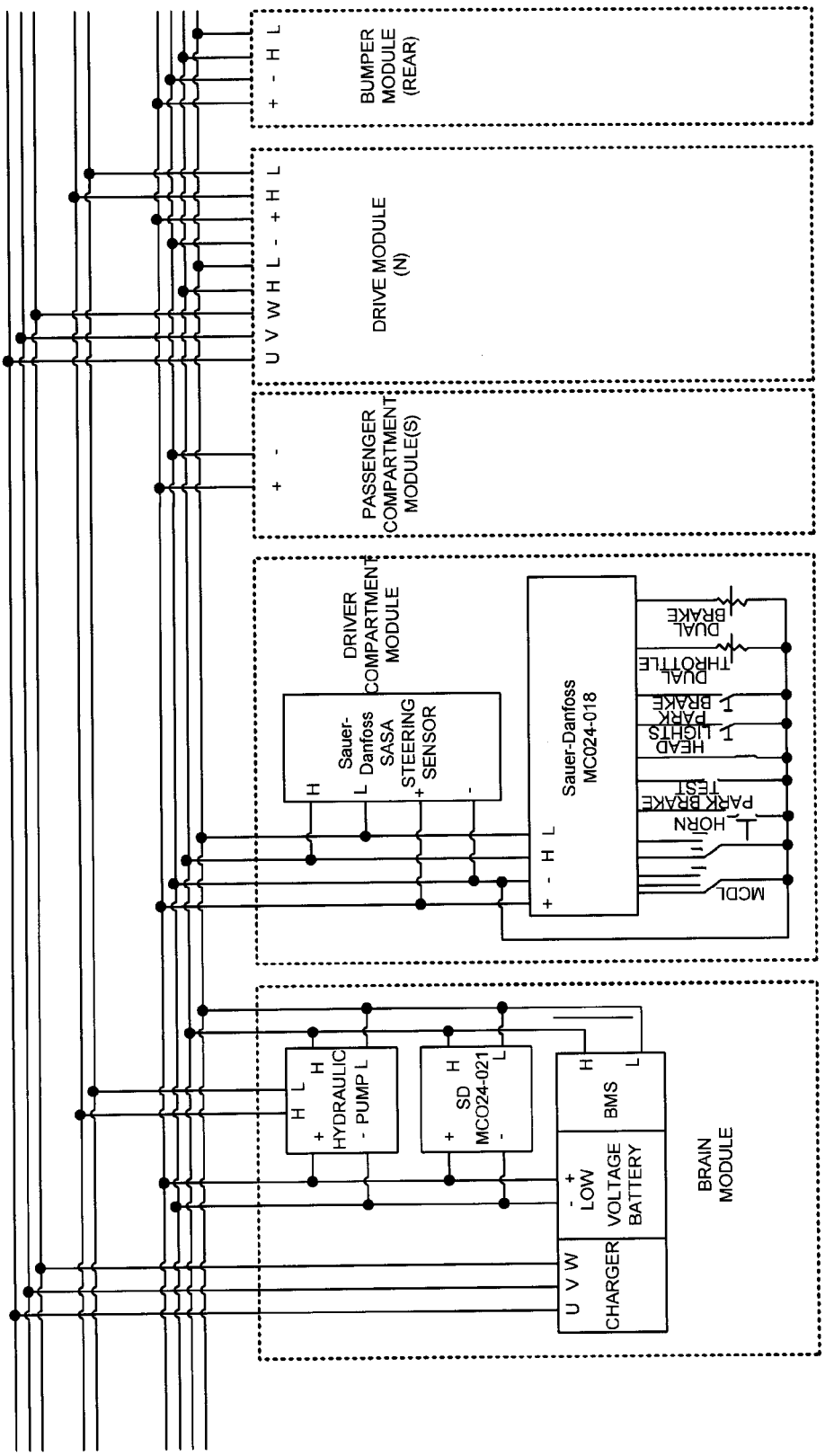
FIG. 17 is one representative wiring schematic of a central network bus on a modular electric vehicle of the present invention.

FIG. 17 shows one example of a wiring or network diagram showing the difference buses and network connections between modules in a sample embodiment of an assembled modular electric vehicle in accordance with the present invention. There are shown a terminal module which is a rear bumper, a drive module, a passenger compartment module, a driver compartment module, and a central control module, labeled as a brain module on this drawing. The top three wires shown in the diagram are a consolidated charging bus, whereby the batteries in individual modules will be charged from a central charging bus simply to require only a single power connection when charging was to be done. The middle two items shown are a hydraulic box between the various modules, and the bottom for connections are a controller area network in a low-voltage bus, to allow for the various control of the modules in the vehicle and low-voltage power for accessory modules and the like.

It will be understood that this is only one possible embodiment of the network bus of the present invention and the connection of various central services between modules and assembled electric vehicle in accordance with the remainder hereof, and that many different types of specific wiring schematics and the light could be created which would all still accomplish the same objective of a central wiring and control infrastructure on the assembled modular vehicle, and all such variations or modifications are contemplated within the scope hereof.

Module Controller:

Each vehicle assembly module would contain a module controller connected to the central network bus. In the case of the terminal vehicle assembly module, the module controller might simply be terminator for the network bus, or it might be any controller capable of controlling lights or other power accessories on that module. In a powered vehicle assembly module, the module controller would be operatively connected to the central network bus as well as to the powered axle, to provide control outputs for the motion or staring at that axle or the wheels on the module to steer the assembled vehicle or driving across the surface. By providing a self-contained module controller within each module of the vehicle, redundancy in the control system is maximized, and control of the assembled vehicle is simplified. With a module controller capable on program to control each relevant component within a particular module, control signals on the central network bus of the vehicle could be simplified since they were just need to instruct or call for particular control outputs which could be interpreted by the module controller on modules which would be required to participate in such an activity and could in turn actuate the necessary items. Inclusion of a basic module controller in each module for assembly into a vehicle, with the necessary control inputs and outputs to actuate the module in question, can be understood by those skilled in the art of electronic systems and controls design.

Wireless Network Interface:

It is specifically contemplated in particular embodiments of the present invention, there may be a wireless network transceiver operatively connected to the central network bus, either for the purpose of allowing wireless communication between modules on the assembled vehicle or alternatively to allow for the control of adjacent modular electric vehicles by another modular electric vehicle in accordance with the present invention. The various modifications which could be made to the overall network architecture on the finished vehicle of the present invention if wireless capability were included will be understood to those skilled in the art of electronic communications.

Vehicle Controller:

In addition to a module controller present on each vehicle assembly module, the assembled modular electric vehicle of the present invention would include the vehicle controller. The vehicle controller would be operatively connected to the central network boss of the vehicle and might comprise either an integral component in a particular type of a vehicle assembly module, or might alternatively simply comprise of electronic module for attachment to a central network bus port somewhere on the assembled vehicle. Either such approaches contemplated within the scope of the present invention. The vehicle controller, it is contemplated, is the hardware module which would be responsible for overall control of the assembled vehicle by dispatch of control signals to individual modules therein on the central network bus. The vehicle controller would need to either recognize and identify the number, position and orientation of various modules within the assembled vehicle, or it could be inputted into the software of the vehicle controller by some type of an operator interface—based upon those inputs or recognitions, the vehicle controller could then load or execute the appropriate control software for the driving and steering, or control of peripherals, on the vehicle.

Operator Interface:

It is specifically contemplated that the modular electric vehicle of the present invention would either be controlled wirelessly or in a hardwired fashion using a "drive by wire" methodology. Standard analog instrumentation, or a digital operator interface, could be used to capture operator inputs related to the operation of the vehicle, and those inputs would be communicated via the controller or controller network on the vehicle to the drive components in the powered vehicle assembly modules to drive and steer the vehicle. Using this type of an approach, with wireless technology, for example the vehicle could effectively be assembled as a transport platform or a transport vehicle without an operator cab thereon, and the operator could have a wireless remote control to use for control and manipulation of the vehicle. This might be done for safety or payload reasons. In other circumstances, such as the truck embodiment shown in FIGS. 1 to 3, and operator cab might be provided on the vehicle and the operator cab might include a steering wheel or other controls which could capture operator inputs for translation and communication to the drive components on the vehicle to again coordinate its movement and steering, or other functionality.

In an embodiment of the modular electric vehicle of the present invention which included a third-party bus connection, by which third-party accessory modules could be connected to the control network on the vehicle, the operator control interface could then also be used, with an appropriate software or configuration change, to control those third-party accessory modules also, if desired. Operator controls could also have safety protocols manufactured in their software such that for example of the third-party accessory was connected to the network bus of the vehicle and that accessory was in operation, the controller on the vehicle could inhibit the ability to move the vehicle while for example the telehandler arm was overextended, the box was in the dumping position or the like.

Many types of drive by wire control systems could be devised and used within the overall methodology of the present invention and all such approaches are expressly contemplated within the scope hereof.

The operator control, in certain circumstances where it was a digital computer interface or the like, might allow for the operator or the assembler to manually input the module configuration of the vehicle once completed, or else the control system on the vehicle could also automatically recognize the type, configuration and relative positioning of individual modules within the vehicle by querying the network addresses of the modules on the controller network. Where a digital operator control was used, the operator control interface itself may also comprise the vehicle controller on the vehicle, whereby that device in addition to capturing operator inputs would also generate the communication signals and instructions to various drive or power components on the vehicle to move, steer or otherwise actuate certain functions thereon.

Dependent upon the particular module configuration of an assembled modular electric vehicle in accordance with the present invention, this type of control system also lends itself to simple conversion for push pull operations. Operator cab modules, with or without independent control hardware, could be placed at either end of the vehicle, or a wireless remote control could be used as well to operate the vehicle in either direction—primary issue with a push pull configuration would be to either have steering powered vehicle assembly modules at both ends of the vehicle to allow for steering from the front of the vehicle, or to have appropriate steering control such that it could be steered when moving in either direction, with a steering axle on one end, or more likely than not in the push pull scenario all of the powered vehicle assembly modules would be steering powered vehicle assembly modules and could all work together to steer the vehicle.

The operator interface could either be a freestanding hardware device used either on board the vehicle more in a wired or wireless tethered situation, to communicate with the vehicle controller and provide operator inputs for the driving, steering and other control of the assembled vehicle. The operator interface and the vehicle controller could be separate hardware components, or in some cases could be integrated into a single hardware and software combination. Both such approaches are contemplated within the scope of the present invention.

Accessory Modules:

In addition to providing on certain vehicle assembly modules of the present invention attachment points for the attachment of third-party components to the vehicle, it may also be the case that it was desired to provide third-party component interface to either the control or communication network on the assembled vehicle and/or the other central conduits—hydraulic, air or the like. By providing for the ability to connect power, hydraulics or the like to a third-party component, another entire realm of flexibility in terms of the delivery and ultimate application of these vehicles is opened, since third parties could manufacture components which could interface with the vehicles and would simply need to know the proper connections and communication and operating parameters which would be provided by those interfaces. By providing the ability to interface a third-party component with the control network on the vehicle, it would also be possible than for the operator controls, as outlined in further detail below, to integrate the control of these third-party components along with driving the vehicle.

Examples of third-party components which could be attached which may or may not require control integration would for example be an air compressor or an auxiliary power converter—if the vehicle itself did not include air conduits for example, but in certain industrial applications compressed air was required, a third-party air compressor could be attached to the vehicle and connected to a power bus to provide power for the air compressor. In other applications and auxiliary power converter might be required or even something like a steam generator or the like in certain applications. Many types of third-party components could be integrated and controlled with the underlying modular electric vehicles of the present invention by providing means of attachment as well as means of connection of those components to the control and other supply conduits on the vehicle. The provision of a protocol and a standardized means and method of attachment for these components is contemplated within the scope of the present invention as well.

Accessory modules could also include modules such as the following for attachment to the remainder of the vehicle:
 a. An operator cab;
 b. A passenger seating module;
 c. A deck surface;
 d. A lifting device;
 e. A payload box; or
 f. A payload tank.

Figure 5:
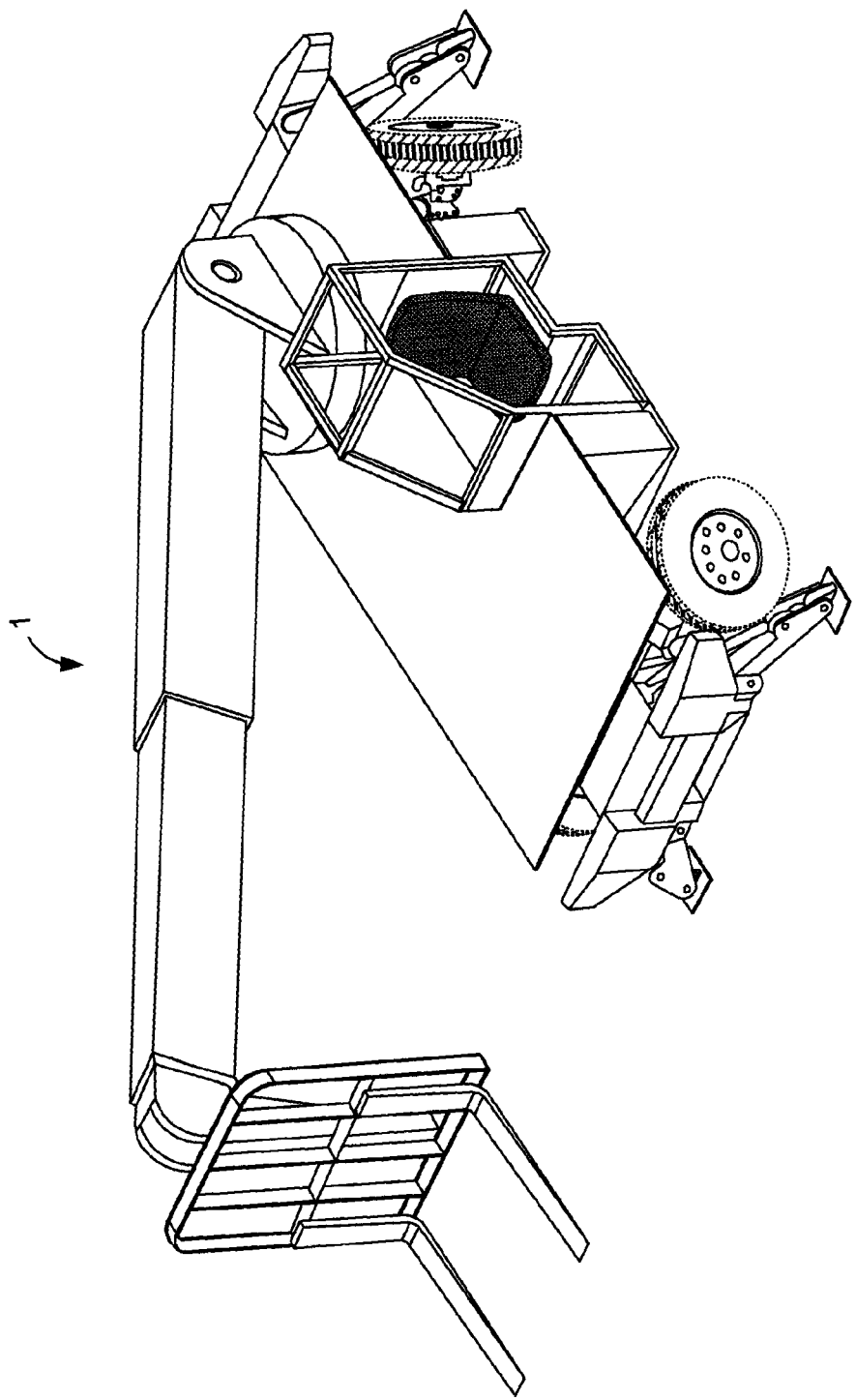
FIG. 5 is a perspective view of a modular electric telehandler vehicle, in accordance with the present invention, with two steering powered vehicle assembly modules.
Figure 6:
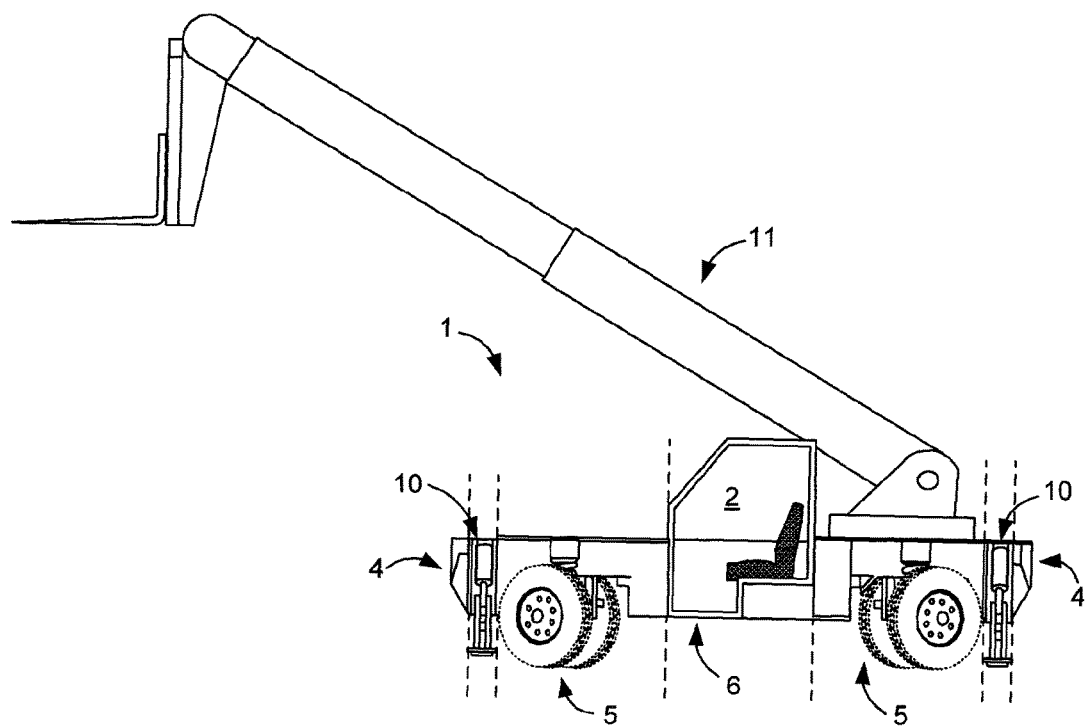
FIG. 6 is a side view of the telehandler embodiment of FIG. 5.

Referring to FIGS. 5 through 16 there are shown some other examples of modular electric vehicles in accordance with the present invention. FIGS. 5 and 6 for example show a telehandler, assembled in similar fashion to the truck of FIGS. 1 to 3. The vehicle 1 is comprised of a plurality of vehicle assembly modules, including two powered vehicle assembly modules 5, an operator cab non powered module 6, two terminal modules 4 being bumper assemblies, and two surface support/dolly foot non-powered modules 10. The actual telehandler assembly on the unit, shown at 11, could be an above-deck modular component which could be added onto the deck in place, and connected to the control/network bus on the vehicle to allow for integrated operator control. The telehandler 11 would be characterized as an on-board component insofar as it might be attached to the completed assembled vehicle base. If it was physically integral with a manufactured vehicle assembly module it could then be considered as a part of the module itself. This particular model of the modular electric vehicle of the present invention shows two steerable powered vehicle assembly modules, which could be used to steer the vehicle in very tight radii.

Figure 7:
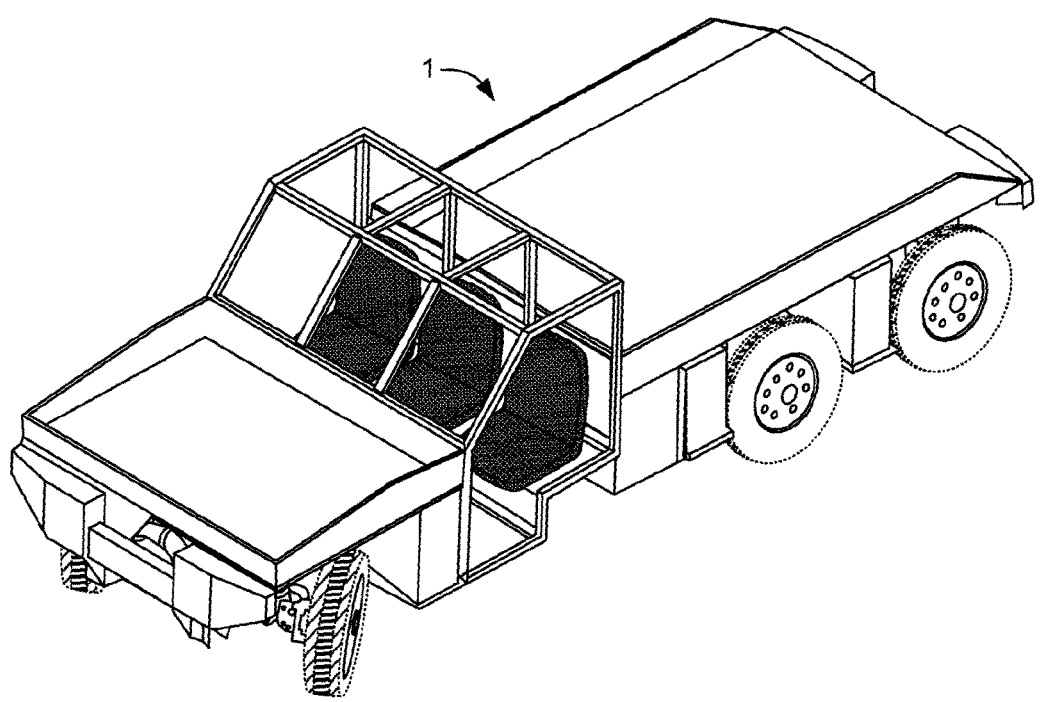
FIG. 7 is a perspective view of a three axle modular electric vehicle in accordance with the present invention, with one steering powered vehicle assembly module.
Figure 8:
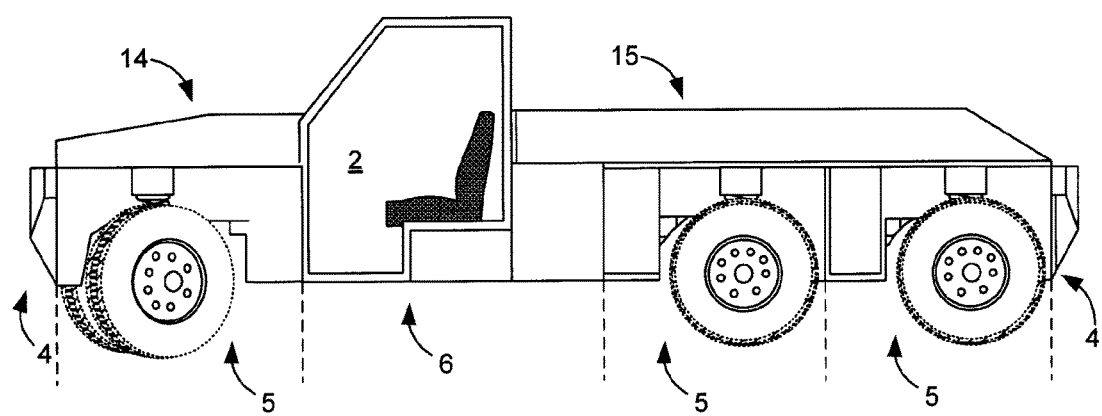
FIG. 8 is a side view of the embodiment of FIG. 7.

FIGS. 7 and 8 show a three axle truck concept again assembled in accordance with the general modular electric vehicle concept of the present invention. There are three powered vehicle assembly modules 5 in this case, one of which is steerable at the front of the vehicle and the two rear axles are not. Two additional accessory modules added to the vehicle are a front and rear storage box on top of the vehicle, shown at 14 and 15 respectively. Also shown are terminal modules 4 and a cab module 6.

Figure 9:
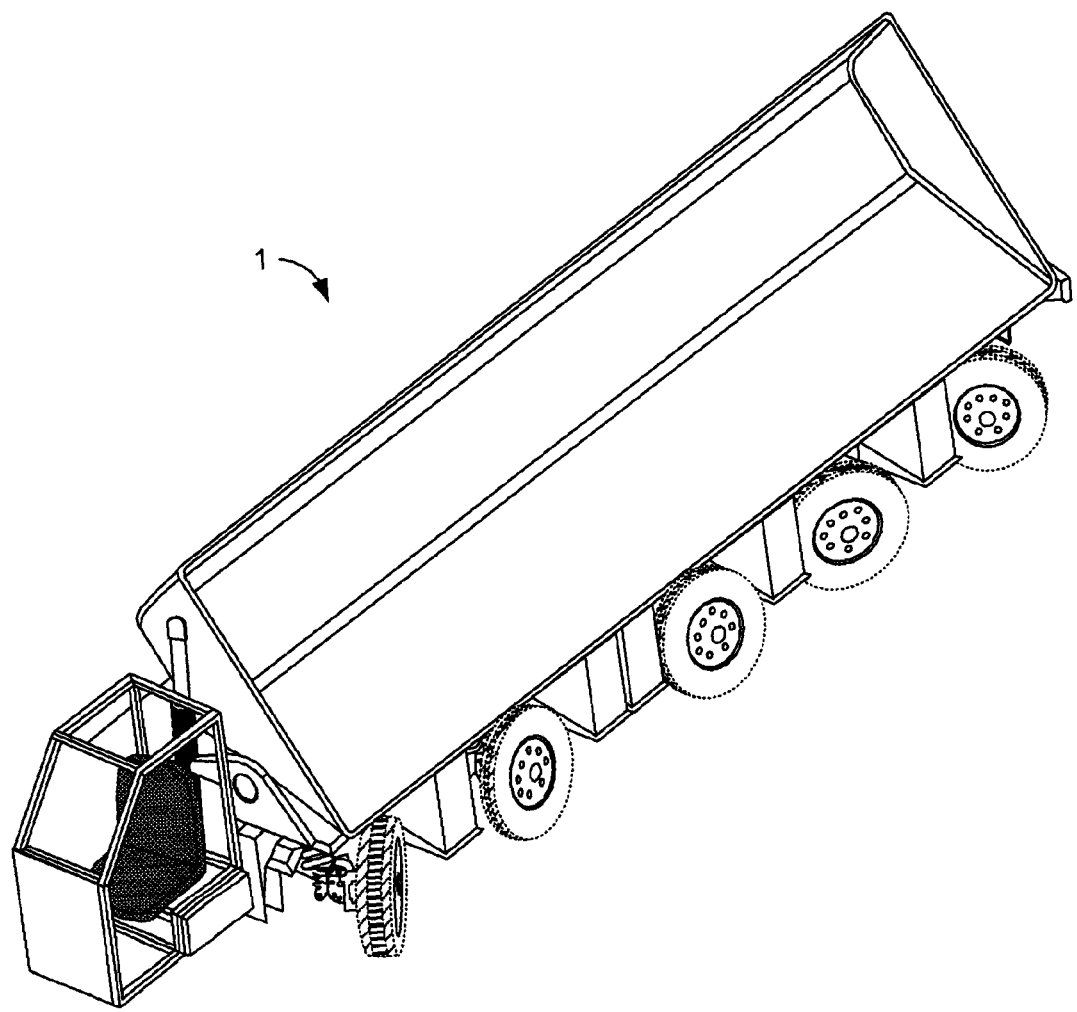
FIG. 9 is a perspective view of a five axle side dump truck embodiment of the present invention, with four steering powered vehicle assembly modules.

Yet another alternate modular electric vehicle of the present invention is shown in FIGS. 9 in 10—this is a five axle side dump truck embodiment, with four steering powered vehicle assembly modules 5 and a side dumping box 13 attached to the top of the vehicle. The center powered vehicle assembly module 5 is not steering in the pictures shown, and the next two powered vehicle assembly modules 5 closest to the center are steering to a lesser degree than those at the distal ends of the vehicle. The amount of steering which would be made by each module could be adjusted by the controller on the vehicle based on its awareness of the proximity of each powered vehicle assembly module 5 to the center of rotation of the vehicle. The side dumping box 13 is just one example of a larger attachment which could be added to the deck of a vehicle assembled from multiple ground engaging powered vehicle assembly modules or non-powered vehicle assembly modules—the dumping controls for the box itself could be connected to the network bus of the remainder of the vehicle.

Figure 10:
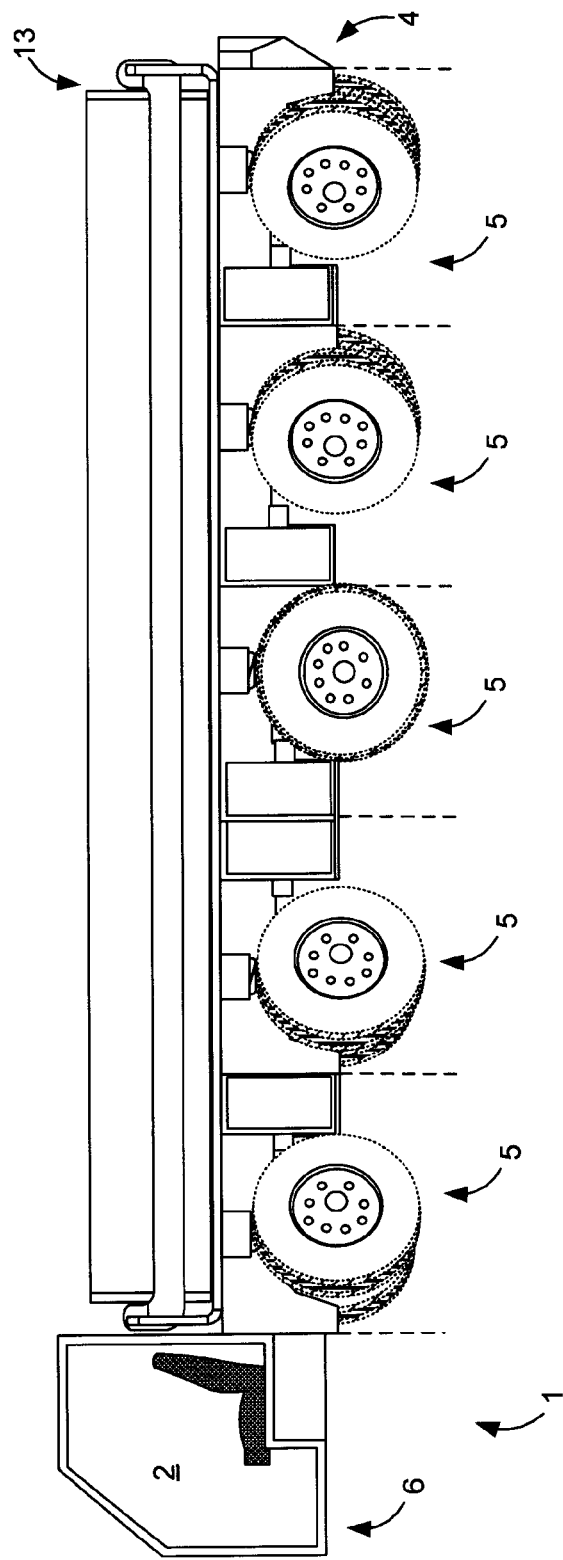
FIG. 10 is a side view of the embodiment of FIG. 9.
Figure 11:
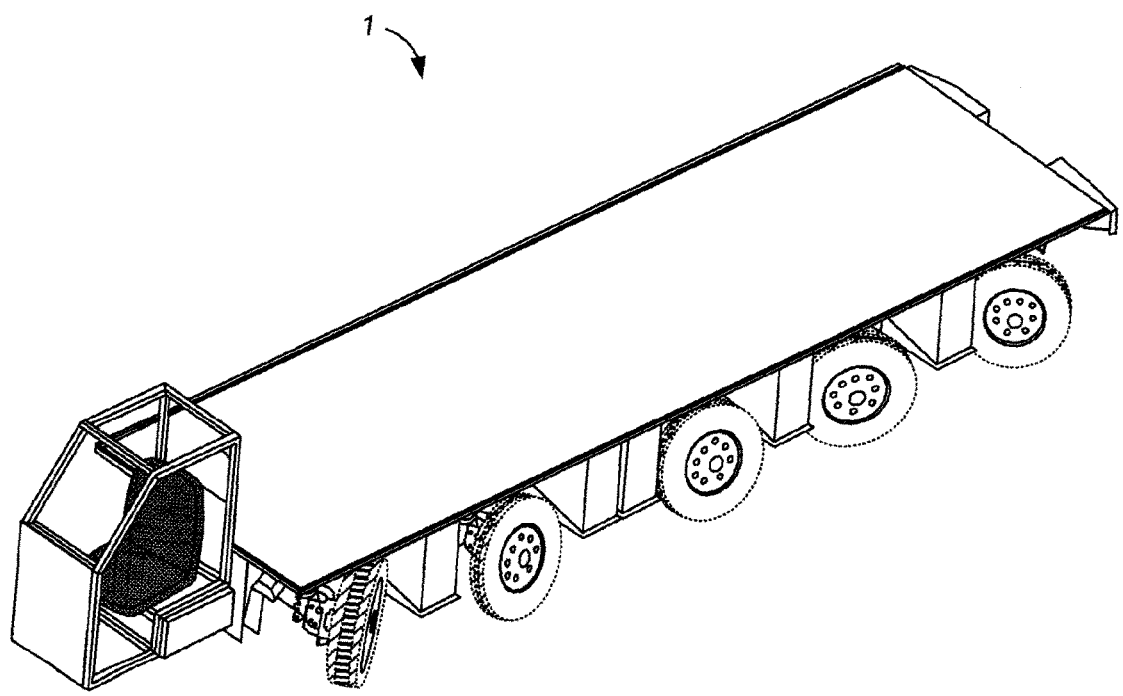
FIG. 11 is a perspective view of a five axle flat deck truck embodiment of the modular electric vehicle of the present invention, with four steering powered vehicle assembly modules.
Figure 12:
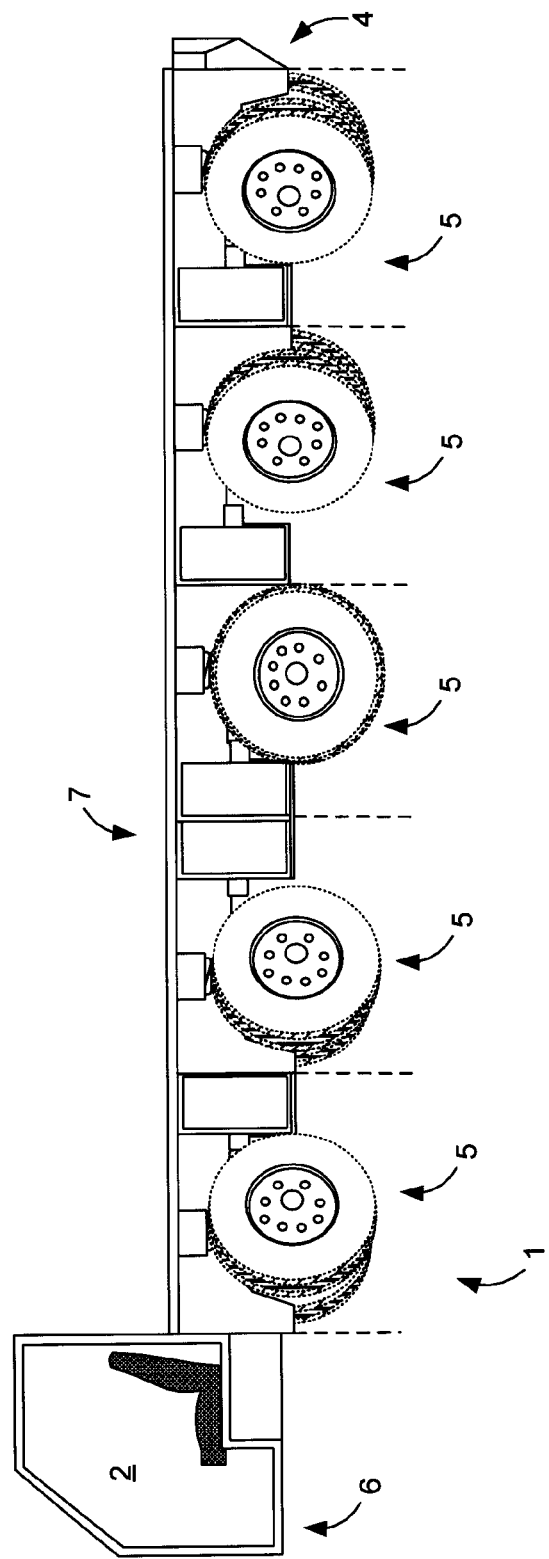
FIG. 12 is a side view of the embodiment of FIG. 11.

FIG. 11 shows a perspective view of a five axle flat deck truck embodiment of a modular electric vehicle of the present invention with four steering powered vehicle assembly modules similar to the side dumping box embodiment of FIGS. 9 and 10. FIG. 12 is a side view of the five axle flat deck truck embodiment of FIG. 11. The assembly of this particular modular vehicle is the same as that of the side dumping box truck shown above, and of the five powered vehicle assembly modules again four of them are steerable and are shown in the steering position.

Figure 13:
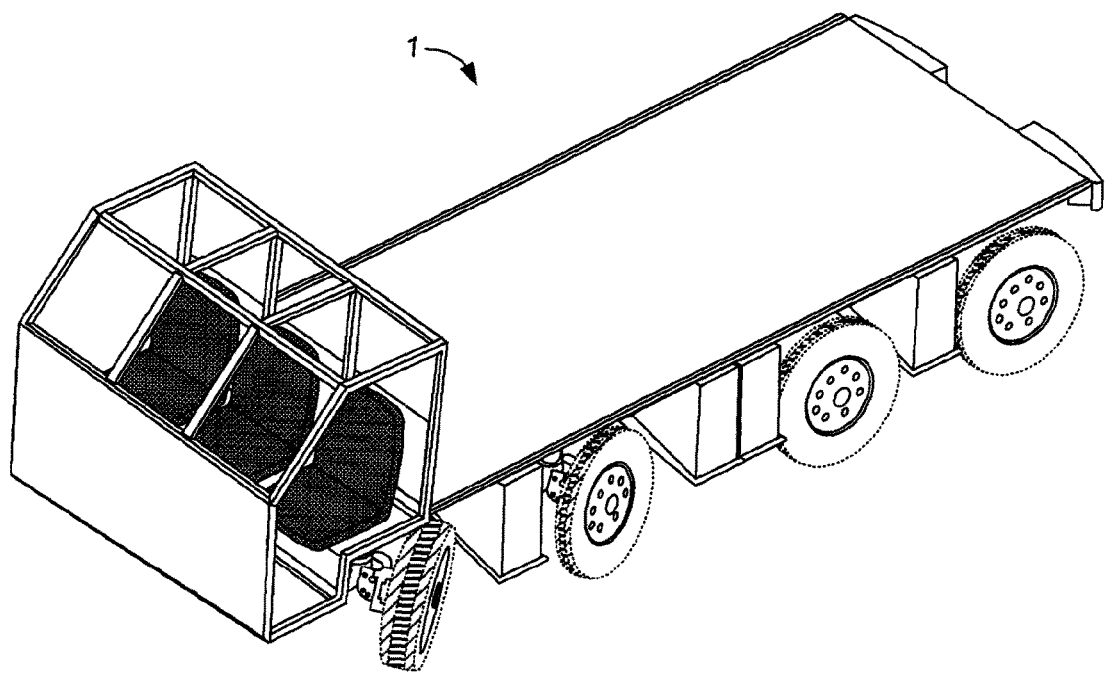
FIG. 13 is a perspective view of a four axle flat deck truck embodiment of the modular electric vehicle of the present invention, with two steering powered vehicle assembly modules.
Figure 14:
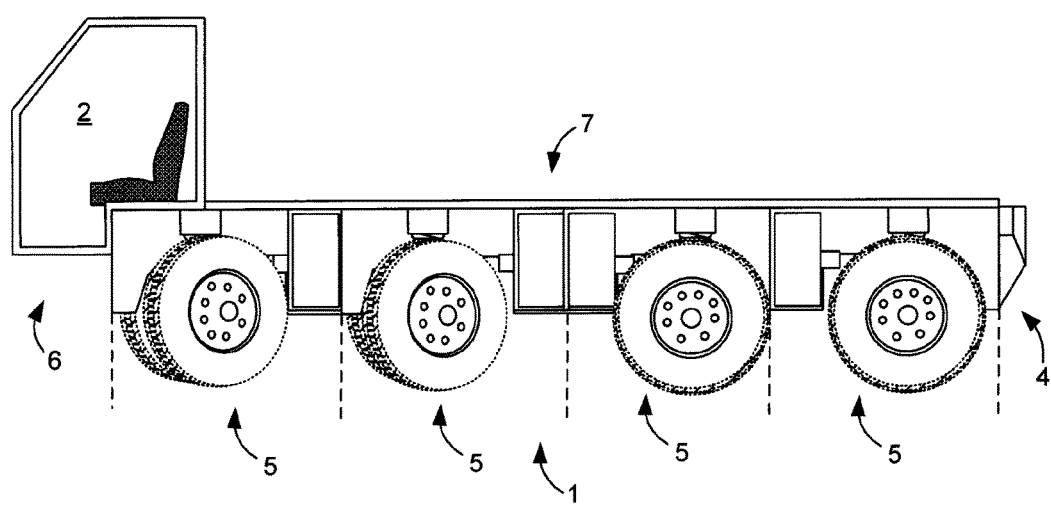
FIG. 14 is a side view of the embodiment of FIG. 13.

FIG. 13 is a perspective view of a four axle flat deck truck in accordance with the present invention, with two steering powered vehicle assembly modules thereunder and the other two not steering. FIG. 14 is a side view of this truck. The two front powered vehicle assembly modules 5 on the truck of this embodiment are the ones being used for steering in this case and this particular illustrated embodiment shows another steering method are steering configuration of the multi-axle vehicle in accordance with the method of the present invention.

Figure 15:
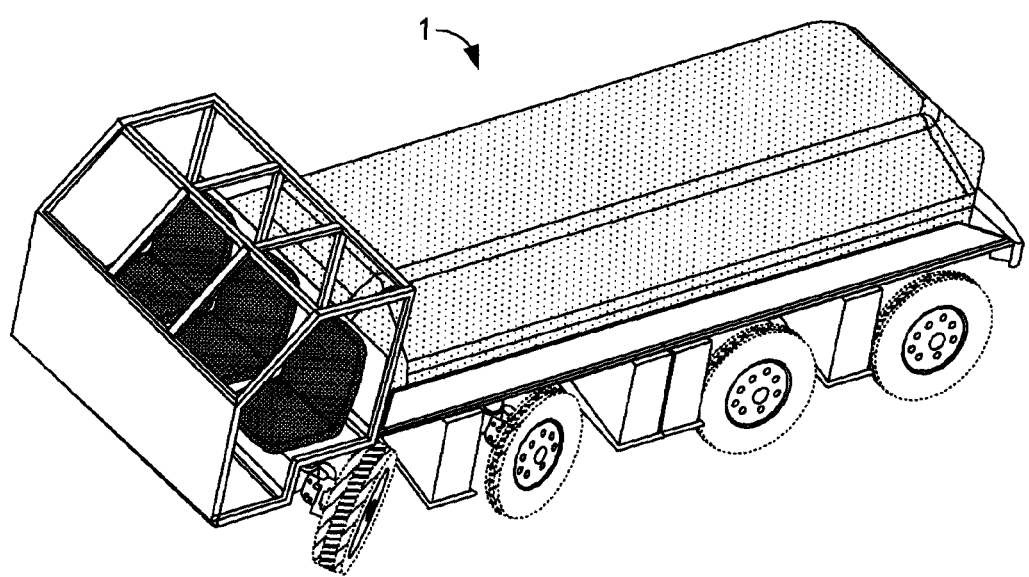
FIG. 15 is a perspective view of a four axle tank truck in accordance with the modular electric vehicle design of the present invention, with two steering powered vehicle assembly modules.
Figure 16:
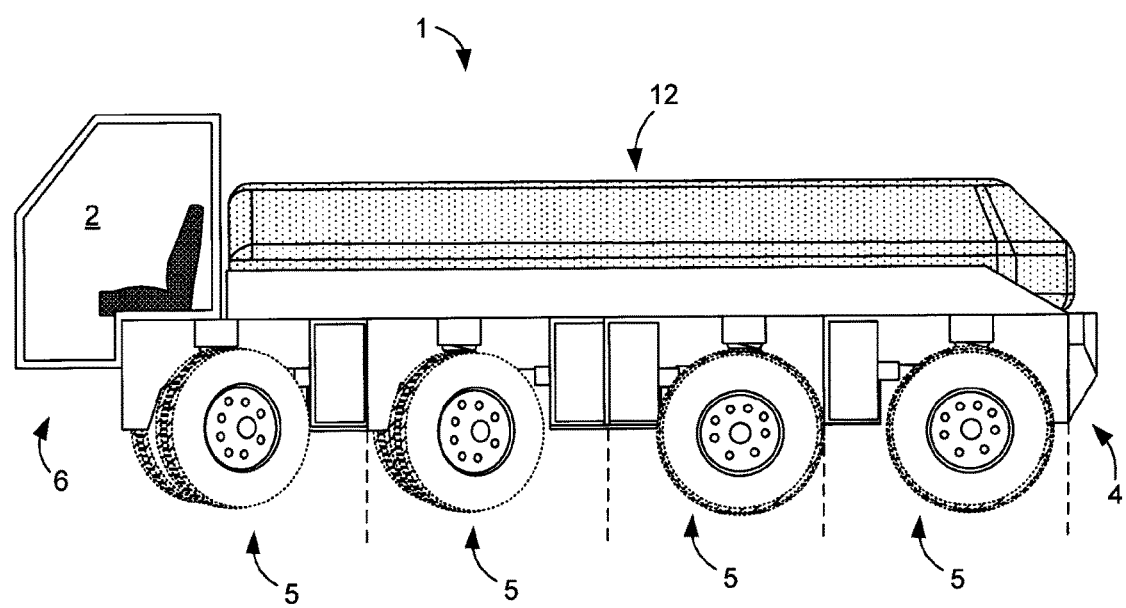
FIG. 16 is a side view of the embodiment of FIG. 15.

Finally, showing one additional variation on the modular electric vehicle of the present invention, FIGS. 15 and 16 show a perspective and side view of a four axle water truck assembled in accordance with the present invention. There are again two of the four powered vehicle assembly modules 5, at the front of the vehicle, which are steering, as is the case with the embodiment of FIGS. 13 and 14. There is also shown a tank 12 is another optional attachment or implement which could be used with the modular electric vehicle of the remainder of the present invention.

In addition to the interchangeable power and non-power vehicle assembly modules outlined herein which could be used to assemble the modular electric vehicle of the present invention, there could also be miscellaneous accessory modules which could be interchangeably added to the vehicles as well. In terms of the accessory modules, these might be any attachable, optional or interchangeable component which can be added to the vehicle which does not comprise either a terminal or a two ended module for assembly into the actual frame and structure of the vehicle, as outlined elsewhere above with respect to the power and non-powered modules. For example something like a dump box or some other type of a toolbox or storage module could be attached to the top of the deck 7 of the truck of FIGS. 1 to 3—insofar as that type of the toolbox or storage component could be optionally added or removed to or from the vehicle, this will be understood again by those skilled in the art. It may be necessary to provide predetermined attachment points for these components on one or more types of vehicle assembly modules—the predetermined attachment points could be incorporated into the manufacture of those vehicle assembly modules such that the attachment points at the reasonably required locations on the various modules in various vehicle configurations would be available for the attachment of a variety of interchangeable components Controlling Adjacent Vehicles:

Another option contemplated within the scope of the present invention would be to provide, gain either for wired or wireless connection, for the control of adjacent vehicles by the controller 41 lead vehicle manufactured in accordance with the present invention. Since each vehicle would be powered, it would not be necessary to physically connect vehicles such as would be done in a tractor-trailer configuration or the like, but the necessary control software could be developed to allow a particular master vehicle in a group of vehicles to slave the other vehicles and effectively have them "follow it" as it was operated. This would allow for the use of a train configuration of smaller vehicles, to minimize operator requirements and still maximize payload abilities etc.—specifically and for example in tight cornering situations where only shorter vehicles would be able to accomplish the cornering required. The ability to connect to a following vehicle and control its steering and locomotion is another aspect of the control system of the present invention which is explicitly contemplated herein. Physically the connection between master and slave vehicles might take the format of a data cable or connection plugged between the vehicles, or more likely, the controllers on individual vehicles could wirelessly connect to each other and operate in an aggregated network fashion. Where the vehicles were intended to be used in this fashion either along their circumference or at the very least at the terminal ends thereof it would likely be the case that some type of proximity sensors would also be used, so that the safe distance between adjacent vehicles and area walls etc. could always be maintained. It may even be the case that to connect the vehicles in the approximate correct proximity and relative location to each other in the "train" format, upon execution of the first wireless handshake or pairing between the vehicles, based on the use of proximity sensors the following vehicle could automatically maneuver itself into the correct position behind the leading vehicle and then as a part and parcel of the control operation maintain its distance and spacing. A control methodology such as this would even eliminate the need to carefully maneuver the vehicle into position in relation to the leading vehicle.

Control Software:

It is envisioned that adaptable and aware control programming could be provided on the controller or controllers on a vehicle in accordance with the present invention so that based upon either the automated detection or manually entered configuration of the various vehicle assembly modules in the assembled modular electric vehicle the power and drive control programming could be modified or executed in a way that would work for the vehicle as configured. For example, in a vehicle that was assembled with a plurality of powered vehicle assembly modules including more than one steering powered vehicle assembly module, the relative steering inputs that the steering hardware on the steering powered vehicle assembly modules would require to steer the vehicle would be based upon amongst other things the proximity of that particular axle or module to the center of rotation of the vehicle. The controller could either be provided with the necessary variable programming to automatically identify and adjust to these scenarios, or the appropriate software could be quickly loaded onto the controller based on the selection of a module configuration for the vehicle. Either approach is again contemplated within the scope of the present invention. The key is that either the single controller attached to the network bus or control network on the assembled vehicle, by way of connection of the network bus as it passes through each adjacent assembled vehicle assembly module, or the network of controllers where individual modules each include a controller, would automatically identify and adapt the behavior of the control of the vehicle based upon the size and particular location and assembly of the modules in the finished vehicle.

User-Selectable Steering Modes:

Certain configurations of modular electric vehicles which were manufactured or assembled in accordance with the method of the present invention could include user selectable steering modes. For example, it could be the case that where multiple steering powered vehicle assembly modules were in place on the vehicle front axle only steering could be selected, or all of the steering axles, even if all of the axles on the vehicle as a whole were steering axles, could be used to steer the vehicle. These different types of steering modes could be selected by an operator for different operational circumstances and it is contemplated that this would be another distinct benefit to the modular assembly and networked control methodology of the modular vehicle of the present invention. The steering modes could include front steering, rear steering, all wheel steering, or crab (parallel) steering.

Keyed Cable Connections:

Insofar as it would be required for the assembler or operator of the vehicle, either assembling or swapping in a vehicle assembly module to a vehicle, either on an assembly floor or on site or infield one thing that would be beneficial to provide as an option to most completely simplified the interconnection of adjacent vehicle assembly modules would be to make the bus or conduit connections between the modules keyed, so that they can only be connected in the correct fashion. Beyond something like color coding which is simply not sufficient, keying the connections such that they could only be assembled in the right way, would be useful to the assembler or the infield maintenance personnel, as it would allow for maximum speed in vehicle service or assembly and minimizing the possibility of incorrectly connecting the wiring network on the vehicle and causing significant damage to the systems thereon. Providing keyed cabling or conduit connections for use with add-on accessory modules, as well as interchangeable vehicle assembly modules to be implemented along the direction of travel vehicle, is also contemplated within the scope of the present invention.

Central Control Network:

In addition to the assembled modular electrical vehicle of the present invention there is also disclosed the central control network for use on such a vehicle.

Vehicle Assembly Module:

Vehicle assembly modules in accordance with the remainder of the present invention form freestanding intended subject matter of this on occasion, in addition to the assembled modular vehicle.

The foregoing is considered as illustrative only of the principles of the invention. Thus, while certain aspects and embodiments of the invention have been described, these have been presented by way of example only and are not intended to limit the scope of the invention as outlined by the specification and claims. The invention described herein may be embodied in a variety of other forms without departing from the spirit of the invention.

We claim:

1. A modular electric vehicle comprising:
   a. an electrical power source;
   b. at least two interchangeable vehicle assembly modules configured to attach together, each vehicle assembly module comprising:
      i. two axial module surfaces at axial ends of the vehicle assembly module with an axis extending therethrough oriented in a direction of travel of the modular electric vehicle;
      ii. at least one connecting module surface at an axial module surface thereof adapted to structurally attach to a connecting module surface of an adjacent vehicle assembly module;
      iii. a central power bus for powering the vehicle assembly module, connectable to the central power bus of the adjacent vehicle assembly modules at adjoining axial module surfaces;
      iv. at least one electrically powered axle connected to the central power bus;
      v. a central network bus for facilitating control of the vehicle assembly module and the modular electric vehicle, connectable to the central network bus of adjacent vehicle assembly modules at adjoining axial module surfaces;
      vi. a module controller connected to and configured to control the at least one electrically powered axle and connected to the central network bus for communication with module controllers of other vehicle assembly modules; and
      vii. the at least one electrically powered axle connected to the central power bus and the central network bus;
   c. wherein at least one powered vehicle assembly modules is steerable, by interaction of the module controller with the at least one powered axle thereof;
   d. a vehicle controller connected to the central network bus configured to control movement and steering of the modular electric vehicle by interaction with module controllers on the powered vehicle assembly modules; and
   e. an operator interface connected to the vehicle controller by which an operator can drive and steer the modular electric vehicle.

2. The modular electric vehicle of claim 1 wherein each interchangeable vehicle assembly module has two opposing connecting module surfaces.

3. The modular electric vehicle of claim 1 wherein one of the at least two interchangeable vehicle assembly modules is a terminal vehicle assembly module having only one connecting module surface for attachment at an end of the modular electric vehicle.

4. The modular electric vehicle of claim 3 wherein the terminal vehicle assembly module comprises network terminators for the central network bus.

5. The modular electric vehicle of claim 3 wherein the terminal vehicle assembly modules comprises power terminators for the central power bus.

6. The modular electric vehicle of claim 1 wherein at least one of the at least two vehicle assembly modules is a non-powered vehicle assembly module.

7. The modular electric vehicle of claim 1 further comprising a wireless communications transceiver operatively connected to the central network bus.

8. The modular electric vehicle of claim 7 wherein the operator interface is connected to the vehicle controller by wireless communication with the wireless communications transceiver.

9. The modular electric vehicle of claim 1 wherein the operator interface is connected to the vehicle controller by wired connection to the central network bus.

10. The modular electric vehicle of claim 1 wherein the vehicle controller is configured to control movement and steering of at least one other modular electric vehicle via a wired control network connection between the modular electric vehicle and the at least one other modular electric vehicle.

11. The modular electric vehicle of claim 7 wherein the vehicle controller is configured to control movement and steering of at least one other modular electric vehicle via wireless control network connection between the modular electric vehicle and the at least one other modular electric vehicle.

12. The modular electric vehicle of claim 10 further comprising proximity sensors configured to sense, and via the vehicle controller and central control network control, proximity of the modular electric vehicle to the at least one other modular electric vehicle being controlled.

13. The modular electric vehicle of claim 1 wherein each of the vehicle assembly modules further comprises accessory module attachment points for the attachment of at least one accessory module to the modular electric vehicle.

14. The modular electric vehicle of claim 13 wherein the at least one accessory module is selected from the group of:
   a. An operator cab;
   b. A passenger seating module;
   c. A deck surface;
   d. A lifting device;
   e. A payload box;
   f. A payload tank.

15. The modular electric vehicle of claim 13 wherein at least one of the vehicle assembly modules further comprises at least one accessory module network connection for connection of the at least one accessory module to the central network bus.

16. The modular electric vehicle of claim 13 wherein at least one of the vehicle assembly modules further comprises at least one accessory module power connection for connection of the at least one accessory module to the central power bus.

17. The modular electric vehicle of claim 16 wherein the vehicle controller controls powered accessory modules on the accessory modules via the central control network.

18. The modular electric vehicle of claim 17 wherein the powered accessory modules are controlled by the operator interface.

19. The modular electric vehicle of claim 1 wherein the vehicle controller is aware of the configuration of the vehicle assembly modules in the modular electric vehicle and selects appropriate control software for the modular electric vehicle from software stored therein based on the configuration.

20. The modular electric vehicle of claim 17 wherein the vehicle controller is aware of the configuration of the vehicle assembly modules and the at least one accessory modules in the modular electric vehicle and selects appropriate control software for the modular electric vehicle from software stored therein based on the configuration.

21. The modular electric vehicle of claim 19 wherein the vehicle controller is aware of the configuration of the vehicle assembly modules and the at least one accessory modules by user input on the operator interface.

22. The modular electric vehicle of claim 19 wherein the vehicle controller is aware of the configuration of the vehicle assembly modules and the at least one accessory modules by a network diagnostic operation on the central network bus to identify an inventory of modules and module relation and interconnection to other modules.

23. The modular electric vehicle of claim 1 wherein the connections of the central network bus between adjacent vehicle assembly modules are effected using keyed cable connections.

24. The modular electric vehicle of claim 1 wherein connections of the central power bus between adjacent vehicle assembly modules are effected using keyed cable connections.

25. The modular electric vehicle of claim 7 wherein connections of the central network bus between adjacent vehicle assembly modules are effected by wireless transceiver communication between the modules and the central network bus.

26. The modular electric vehicle of claim 1 wherein the operator interface allows the operator to select from a plurality of user selectable steering modes.

27. The modular electric vehicle of claim 1 wherein the vehicle controller and the operator interface are integrated.

28. The modular electric vehicle of claim 1 wherein each connecting module surface comprises a symmetrical attachment mechanism for interchangeable connection of the connecting module surface with the connecting module surface of another vehicle assembly module.

29. A central control network for use on a modular electric vehicle comprising a plurality of interchangeable vehicle assembly modules, wherein:
  a. at least two of the interchangeable vehicle assembly modules are powered vehicle assembly modules comprising:
    i. two axial module surfaces at axial ends of the vehicle assembly module with an axis extending therethrough oriented in a direction of travel of the modular electric vehicle, and at least one connecting module surface at an axial module surface thereof configured for structural attachment to an adjoining connecting module surface of an adjacent vehicle assembly module;
    ii. an electrical power source;
    iii. a first central power bus connectable to a second central power bus of adjacent vehicle assembly modules at adjoining module surfaces, and connected to the electrical power source;
    iv. at least one electrically powered axle; and
    v. at least one of the vehicle assembly modules is steerable by interaction of a module controller with the at least one powered axle thereof;
  the central control network comprising:
    vi. a central network bus extending through each interchangeable vehicle assembly module and connectable at each connecting module surface to the central network bus extending through adjacent vehicle assembly modules;
    vii. a module controller within each vehicle assembly module, connected to the central network bus and the central power bus and configured to control power or steering components thereon;
    viii. a vehicle controller connected to the modular electric vehicle and the central network bus configured to control the modular electric vehicle by interaction with the module controllers on the vehicle assembly modules; and
    ix. an operator interface connected to the vehicle controller by which an operator can drive and steer the modular electric vehicle.

30. The central control network of claim 29, wherein the module controller on at least one of the at least two vehicle assembly modules is connected to an accessory module requiring operator control, and the vehicle controller operates to control the accessory module through the operator interface.

31. The central control network of claim 29, wherein the central network bus connection between at least one pair of adjacent connecting module surfaces is a wired connection.

32. The central control network of claim 29, wherein the central network bus connection between at least one pair of adjacent connecting module surfaces is a wireless connection.

33. An interchangeable vehicle assembly module of a modular electric vehicle, comprising:
  a. two axial module surfaces at axial ends of the vehicle assembly module with an axis extending therethrough oriented in a direction of travel of the modular electric vehicle;
  b. at least one connecting module surface at an axial module surface thereof configured to attach to an adjoining connecting module surface of an adjacent vehicle assembly module;
  c. a central power bus connectable to the central power bus of adjacent vehicle assembly modules at adjoining module surfaces;
  d. a central network bus connectable to the central network bus of adjacent vehicle assembly modules at adjoining module surfaces; and
  e. a module controller connected to the central power bus and the central network bus.

34. The interchangeable vehicle assembly module of claim 33 having two connecting module surfaces at ends of the axis thereof.

35. The interchangeable vehicle assembly module of claim 33 having only one connecting module surface for attachment at an end of the modular electric vehicle.

36. The interchangeable vehicle assembly module of claim 35 further comprising network terminators for the central network bus.

37. The interchangeable vehicle assembly module of claim 35 further comprising power terminators for the central power bus.

38. The interchangeable vehicle assembly module of claim 33 further comprising:
   a. at least one powered axle operatively connected to the central power bus and the central network bus and controlled by the corresponding module controller; and
   b. an electrical power source on the vehicle assembly module connected to the central power bus.

39. The interchangeable vehicle assembly module of claim 38 wherein at least one powered axle is steerable.

40. The interchangeable vehicle assembly module of claim 33 further comprising an electric power source connected to the central power bus.

41. The interchangeable vehicle assembly module of claim 33 further comprising accessory module attachment points for attaching at least one accessory module thereto.

42. The interchangeable vehicle assembly module of claim 33 further comprising at least one accessory module network connection for connecting an accessory module to the central network bus.

43. The interchangeable vehicle assembly module of claim 33 further comprising at least one accessory module power connection for connecting an accessory module to the central power bus.

44. The interchangeable vehicle assembly module of claim 33 wherein each connecting module surface comprises a symmetrical attachment mechanism for connecting the connecting module surface with the connecting module surface of another vehicle assembly module.

* * * * *